United States Patent
Mitani

[11] Patent Number: 6,014,224
[45] Date of Patent: Jan. 11, 2000

[54] APPARATUS AND METHOD FOR PRINT CONTROL

[75] Inventor: Keisuke Mitani, Yokohama, Japan

[73] Assignee: Canon Kabushiki Kaisha, Tokyo, Japan

[21] Appl. No.: 09/010,563

[22] Filed: Jan. 22, 1998

Related U.S. Application Data

[63] Continuation of application No. 08/643,749, May 6, 1996, Pat. No. 5,737,503.

[30] Foreign Application Priority Data

| May 10, 1995 | [JP] | Japan | 7-136174 |
| May 10, 1995 | [JP] | Japan | 7-136175 |
| Jun. 26, 1995 | [JP] | Japan | 7-159470 |
| Apr. 24, 1996 | [JP] | Japan | 8-102496 |

[51] Int. Cl.[7] .................................................. G06K 15/00
[52] U.S. Cl. .......................................... 358/1.16; 358/1.17
[58] Field of Search .................................. 395/101, 112, 395/113, 114, 115, 116, 117; 358/426, 261.1, 261.2, 261.3, 261.4, 444, 427, 430, 432, 433; 345/520, 521, 507, 509, 515, 516, 517, 514, 202, 203

[56] References Cited

U.S. PATENT DOCUMENTS

| 5,136,688 | 8/1992 | Morikawa et al. | 395/115 |
| 5,604,846 | 2/1997 | Kadota | 395/115 |
| 5,611,024 | 3/1997 | Adams | 395/115 |
| 5,737,503 | 4/1998 | Mitani | 395/115 |
| 5,870,535 | 2/1999 | Duffin | 395/115 |
| 5,920,686 | 7/1999 | Mitani | 395/115 |

*Primary Examiner*—Arthur G. Evans
*Attorney, Agent, or Firm*—Fitzpatrick, Cella, Harper & Scinto

[57] ABSTRACT

A print control device allows image data to be generated from intermediate data and printed by a printing unit. The print control device comprises generating means for generating image data from intermediate data memorized in an intermediate buffer, a band raster buffer for memorizing said image data generated by said generating means, a cache buffer for allowing cache of said image data generated by said generating means, and control means for reserving said intermediate buffer for memorizing said intermediate data by extending said band raster buffer to a full-raster buffer of one page or deleting said cache buffer, when the capacity of said intermediate buffer is insufficient.

13 Claims, 18 Drawing Sheets

*FIG. 11A* *FIG. 11B* *FIG. 11C*
*FIG. 11D* *FIG. 11E*
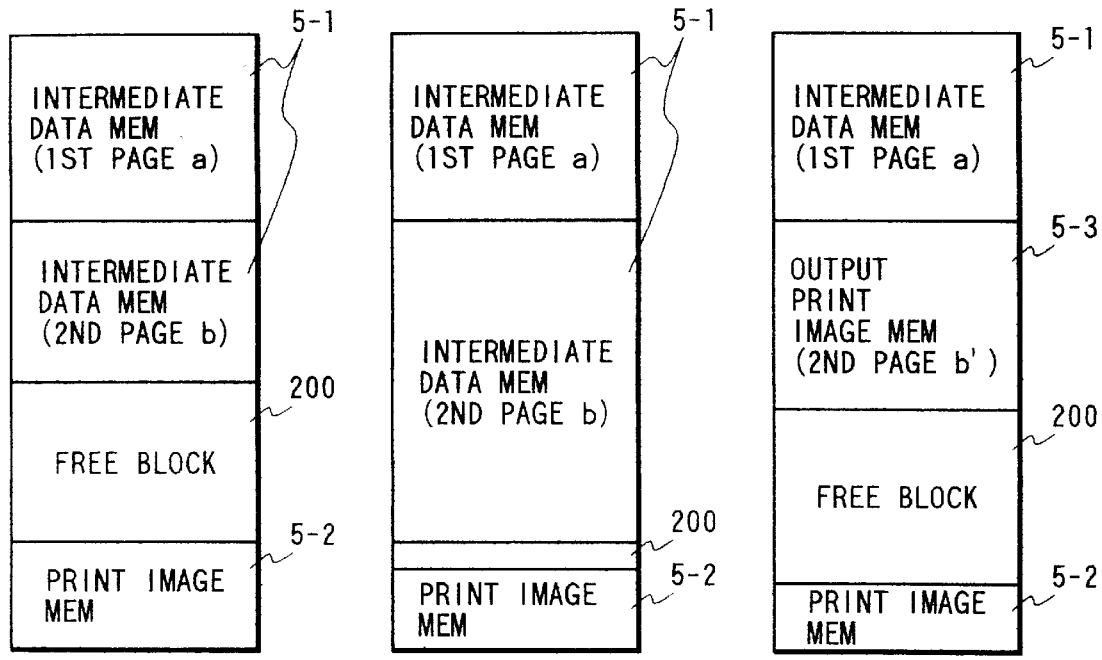
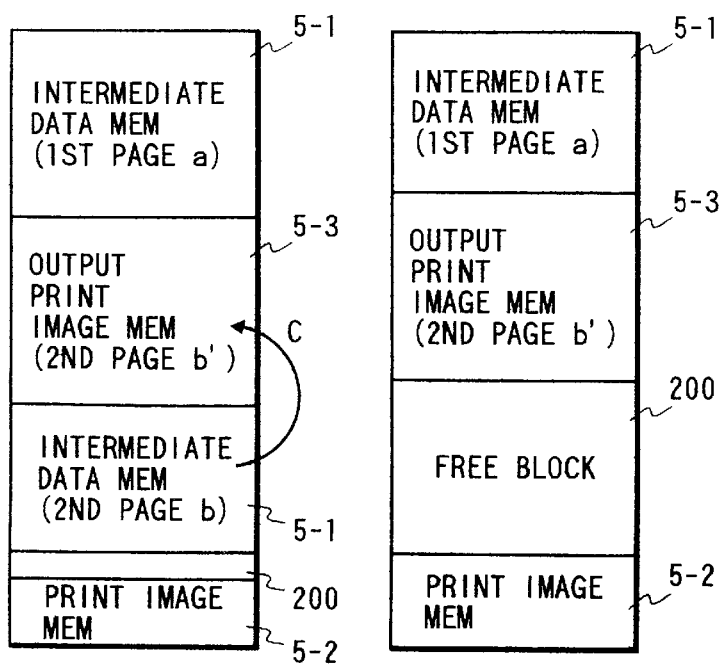

APPARATUS AND METHOD FOR PRINT CONTROL

This is a continuation of patent application Ser. No. 08/643,749, now U.S. Pat. No. 5,737,503.

BACKGROUND OF THE INVENTION

1. Field of the Invention

The present invention relates to a print control device, a memory control method, a print control method, and a memory medium for allowing image data to be generated from intermediate data and printed by a printing unit.

2. Related Background Art

Conventionally, the printing apparatuses of the type in which the print image creating position within a page of data can not be determined in the order of receiving input data (e.g., page description language) involved creating (rasterizing) visual image for the print output after receiving input data of one page.

In many printing apparatuses of this type, because if the print image to be actually printed is directly received for processing, received data will become very large, input data for each object such as "character data" or "circle" is received for processing.

Such printing apparatuses of the type in which input data is formed (rasterized) into print data at the same time when input data is received had a problem that print image data is significantly larger than input data with higher resolution of printing apparatuses, and a memory capacity amounting to the maximum output size is always needed, for which a large capacity memory device (raster buffer) dedicated for the output print image is required, resulting in the increased cost of printing apparatuses. Herein, a memory device (RAM) within a printing apparatus is allocated to an intermediate buffer for memorizing intermediate data as hereinafter described as a print assurance memory area, a raster buffer for memorizing print image data rasterized from the intermediate data, or a cache buffer as hereinafter described, in addition to a reception buffer for temporarily memorizing input data received.

Hence, there were some printing apparatuses of the type in which received input data is stored in an intermediate buffer within an internal memory (RAM) in the format before forming the print image (intermediate data), and after storage of one page, collectively rasterized to form the print image, but they had a problem that when intermediate data of one page has a size exceeding a storage capacity of the intermediate buffer provided in the printing apparatus (memory overflow), that intermediate data of its page could not be processed.

Also, the printing apparatuses of the type in which, regarding data such as e.g., character data for which it takes much time to form print image, data once formed into a print image is saved in a cache buffer of the internal memory (RAM), and then the print image within the cache buffer is used for the same print data, thereby shortening the total processing time, had a problem that the memory device (RAM) having large enough capacity must be prepared to shorten the processing time, because its efficiency can be determined by the storage capacity of memory device (RAM).

Also, the printing apparatuses which perform the printing on both sides of a recording sheet as recording medium involved forming (rasterizing) the print image and outputting it visually, after completion of receiving the input data of necessary pages, even if the page order of input data received and the page order of print image to be printed are not matched owing to the way of storing the recording sheets which have been printed.

Those above-mentioned printing apparatuses, which form print image from input data at the same time when receiving the input data, require a memory device (RAM) having a raster buffer of large capacity, because the amount of image data for the print image is significantly larger than the amount of input data as the resolution of printing apparatuses increases. Hence, especially the printing apparatuses having a perfect printing feature had a problem that the cost of the apparatus may be increased.

Thus, a printing apparatus has been proposed in which input data received is stored in a memory device in the state before forming the print image (intermediate data), and the print image is formed after completion of storing the intermediate data of one page. That is, since input data is converted into intermediate data which is memorized in an intermediate buffer, more input data can be processed for printing within a limited memory capacity.

Also, a printing apparatus having a form overlay processing function is well known in which when a part of input data is the same for every page, such input data (form data) of the same content is preregistered in memory in the format of intermediate data, and the preregistered form data is added to the received input data for the printing, for that part of the same content for every page. Herein, the form data includes data such as external character, LOGO, or the ruled line.

Also, in the above-mentioned printing apparatus having the form overlay processing function, for example, when the image forming order is problematical of input data which is formed (rasterized) visually at the same position, the print data (form data) to effect the form overlay processing is often formed (rasterized) into visual image before received input data, seeing that the form overlay processing function is more frequently used for the frame or LOGO.

However, when data indicating the form overlay processing for the printing page is not provided at the top of page, there was a problem that the printed result was quite different from expected one, such as the form data not formed or the form data printed later, for example, if the capacity of memory device becomes insufficient.

SUMMARY OF THE INVENTION

In order to resolve the aforementioned problems, it is an object of the present invention to provide a print control device and a memory control method for assuring the printing process by reserving an intermediate buffer for memorizing intermediate data, in such a way as to extend a band raster buffer to a full-raster buffer of one page or delete a cache buffer, when the capacity of the intermediate buffer for memorizing intermediate data is insufficient, as well as a memory medium having memorized therein a control program for executing the above operation.

Also, it is another object of this invention to provide a print control device and a memory control method for assuring the perfect printing process by reserving an intermediate buffer for memorizing intermediate data which has become insufficient of capacity, in such a way as to extend a band raster buffer for memorizing at least one of image data for front page and image data for back page to a full-raster buffer of one page, when the capacity of the intermediate buffer for memorizing at least one of intermediate data for front page and intermediate data for back page is insufficient, as well as a memory medium having memorized therein a control program for executing the above operations.

Also, in order to resolve the above-mentioned problems, it is a further object of the invention to provide a print control device and a print control method for assuring a form overlay printing process by processing the form data memorized in memory means, when the amount of intermediate data memorized in an intermediate buffer exceeds a predetermined value, as well as a memory medium having memorized a control program for executing the above operation.

A print control device according to the present invention, which allows image data to be generated from intermediate data and printed by a printing unit, comprises generating means for generating image data from intermediate data memorized in an intermediate buffer, a band raster buffer for memorizing said image data generated by said generating means, a cache buffer for allowing cache of said image data generated by said generating means, and control means for reserving said intermediate buffer for memorizing said intermediate data by extending said band raster buffer to a full-raster buffer of one page or deleting said cache buffer, when the capacity of said intermediate buffer is insufficient.

Also, a memory control method according to the present invention in a print control device having a band raster buffer for memorizing image data which is generated from intermediate data, and a cache buffer for allowing cache of image data, comprises a generation process for generating image data from intermediate data memorized in an intermediate buffer, and a control process for reserving said intermediate buffer for memorizing said intermediate data by extending said band raster buffer to a full-raster buffer of one page or deleting said cache buffer, when the capacity of said intermediate buffer is insufficient.

Also, a print control device according to the present invention, which allows the perfect printing in a printing unit by generating image data from intermediate data, comprises generating means for generating image data for front page and image data for back page from intermediate data for front page and intermediate data for back page which are memorized in an intermediate buffer, respectively, a band raster buffer for memorizing image data for front page and image data for back page which are generated by said generating means, respectively, and control means for reserving said intermediate buffer for memorizing intermediate data for which the memory capacity is insufficient, by extending said band raster buffer for memorizing at least one of said image data for front page and said image data for back page to a full-raster buffer of one page, when the capacity of said intermediate buffer for memorizing at least one of said intermediate data for front page and said intermediate data for back page is insufficient.

Also, a memory control method according to the present invention in a print control device having an intermediate buffer for memorizing intermediate data and a band raster buffer for memorizing image data which is generated from said intermediate data, comprises a generation process of generating image data for front page and image data for back page from intermediate data for front page and intermediate data for back page which are memorized in said intermediate buffer, respectively, a memorizing process of memorizing said image data for front page and said image data for back page which are generated in said generation process into said band raster buffer, and a control process of reserving said intermediate buffer for memorizing intermediate data for which the memory capacity is insufficient, by extending said band raster buffer for memorizing at least one of said image data for front page and said image data for back page to a full-raster buffer of one page, when the capacity of said intermediate buffer for memorizing at least one of said intermediate data for front page and said intermediate data for back page is insufficient.

Also, a print control device according to the present invention, which allows image data generated from intermediate data and form data to be printed in superposition by a printing unit, comprises generating means for generating image data from intermediate data memorized in an intermediate buffer, memorizing means for memorizing said form data, and control means for processing said form data memorized in said memorizing means, when the amount of intermediate data memorized in said intermediate buffer exceeds a predetermined value.

Also, a print control method according to the present invention, which allows image data generated from intermediate data and form data memorized in memorizing means to be printed in superposition by a printing unit, comprises a generating process of generating said image data from said intermediate data memorized in an intermediate buffer, and a control process of processing said form data memorized in said memorizing means, when the amount of intermediate data memorized in said intermediate buffer exceeds a predetermined value.

Also, a memory medium according to the present invention image memorizes a control program for use in a print control device having a band raster buffer for memorizing image data generated from intermediate data and a cache buffer for allowing cache of image data, the control program comprising a generation module for use in a generation process of generating image data from intermediate data memorized in an intermediate buffer, and a control module for use in a control process of reserving said intermediate buffer for memorizing said intermediate data, by extending said band raster buffer to a full-raster buffer of one page or deleting said cache buffer, when the capacity of said intermediate buffer is insufficient.

Also, a memory medium according to the present invention memorizes a control program for use in a print control device having an intermediate buffer for memorizing intermediate data and a band raster buffer for memorizing image data generated from said intermediate data, the control program comprising a generation module for use in a generation process of generating image data for front page and image data for back page from intermediate data for front page and intermediate data for back page which are memorized in said intermediate buffer, respectively, a memorizing module for use in a memorizing process of memorizing said image data for front page and said image data for back page which are generated by said generation module into said band raster buffer, and a control module for use in a control process for reserving said intermediate buffer for memorizing intermediate data for which the memory capacity is insufficient, by extending said band raster buffer for memorizing at least one of said image data for front page and said image data for back page to a full-raster buffer of one page, when the capacity of said intermediate buffer for memorizing at least one of said intermediate data for front page and said intermediate data for back page is insufficient.

Also, a memory medium according to the present invention image memorizes a control program for use in a print control device for allowing image data generated from intermediate data and form data memorized in memory means to be printed in superposition by a printing unit, said control program comprising a generation module for use in a generation process of generating said image data from said intermediate data memorized in an intermediate buffer, and a control module for use in a control process of processing form data memorized in said memory means, when the amount of intermediate data memorized in said intermediate buffer exceeds a predetermined value.

BRIEF DESCRIPTION OF THE DRAWINGS

FIGS. 11A to 11E are another transition diagrams of memory area in the example 2.

DETAILED DESCRIPTION OF THE DRAWINGS

The present invention will be now described in detail by way of example with reference to the drawings.

Figure 1:
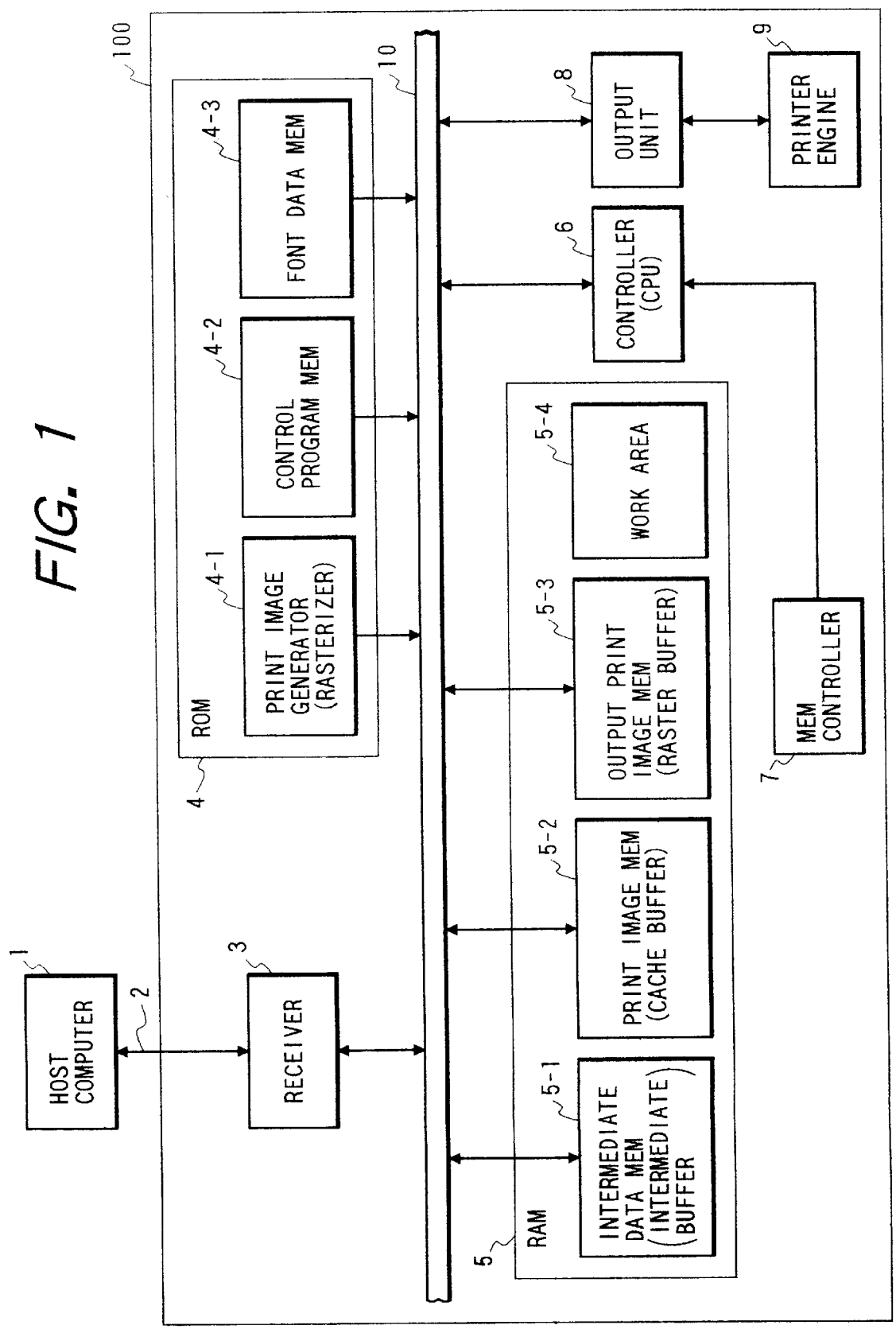
FIG. 1 is a diagram showing the configuration of a print control device in each example according to the present invention.

The following is one example of the present invention, and FIG. 1 is a schematic diagram showing the configuration of a printing system in this example.

1 is a host computer for generating input data (e.g., page description language made up of character codes or control codes) and outputting it to a print control device 100 of this example.

2 is an interface cable (e.g., parallel interface or serial interface) for passing input data from the host computer 1 to the print control device 100 of this example. Note that this interface cable may be a bicentronics interface which is a bidirectional interface.

3 is a receiver (including a reception buffer) for receiving input data via the interface cable 2. And received input data is transformed into intermediate data by a CPU as hereinafter described, and memorized in an intermediate buffer.

4 is a ROM, comprised of a print image generator 4-1 which stores a print image generating program (rasterizer) for generating (rasterizing) print image to be actually output based on intermediate data, a control program memory 4-2 for storing various control programs as shown in a flowchart as hereinafter described, and a font data memory 4-3. Note that the print image generator may be constituted by a hardware, instead of the program, or may be switched between program and hardware for rasterization.

5 is a memory device (e.g., RAM) for storing various data, comprising an intermediate data memory 5-1 (e.g., an intermediate buffer composed of RAM) for storing intermediate data generated from input data which has been received in a reception buffer, a print image memory 5-2 (e.g., a cache buffer composed of RAM) for storing print image data to be reused, an output print image memory 5-3 (e.g., a raster buffer composed of RAM) for storing output print image data after image formation of intermediate data, and a work area 5-4 as hereinafter described. Note that each area of the intermediate buffer, the cache buffer or the raster buffer which constitute a print assurance memory area is dynamically changed.

6 is a controller (CPU) for controlling the entire printing apparatus.

7 is a memory controller which stores a program for managing or changing on demand the ratio of capacities in the intermediate data memory (intermediate buffer) 5-1, the print image memory (cache buffer) 5-2 and the output print image memory (raster buffer) 5-3 in the memory device 5. Note that this program will be described later in connection with FIG. 4.

8 is an output unit (output interface) for outputting print image generated to a printer engine 9.

10 is a bus for passing data through the entire system.

A fundamental data processing flow of the print control device 100 will be described below in connection with FIG. 1.

First, the memory device (RAM) 5 is fundamentally comprised of the intermediate data memory 5-1 (intermediate buffer), the print image memory 5-2 (cache buffer), and the output print image memory 5-3 (raster buffer) for memorizing the output print image of band size or one page.

Input data generated in the host computer 1 is fed via the interface 2 to the print control device 100. The print control device 100 stores intermediate data generated from input data received in the reception buffer (RAM) within the receiver 3 into the intermediate data memory (intermediate buffer) 5-1 under control of the control unit (CPU) 6.

After intermediate data of e.g. one page is stored in the intermediate data memory 5-1, the intermediate data is transformed on demand into actual print image by the print image generator (a rasterizer comprised of program or hardware) 4, which is then stored in the raster buffer 5-3 of band size. And print image data received from the raster buffer 5-3 is output as visual image by the printer engine 9.

Note that the above-mentioned intermediate data means processed data from input data so that print image data (bit map data) can be easily produced from input data such as PDL input by the host computer 1.

At a step of forming print image, the control unit (CPU) 6 stores an object (e.g. character code) having higher possibility (frequency) of print image formation among the print data, or the print image that has been formed, into the print image memory (cache buffer) 5-2. And when processing again the print data required to form the same print image, formation of its print image is not done, and the print image stored in the print image memory (cache buffer) 5-2 is reused to shorten the total time taken to form print image.

The capacities of the intermediate data memory (intermediate buffer) 5-1, print image memory (cache buffer) 5-2 and output print image memory (raster buffer) 5-3 are dynamically increased or decreased.

Figure 2:
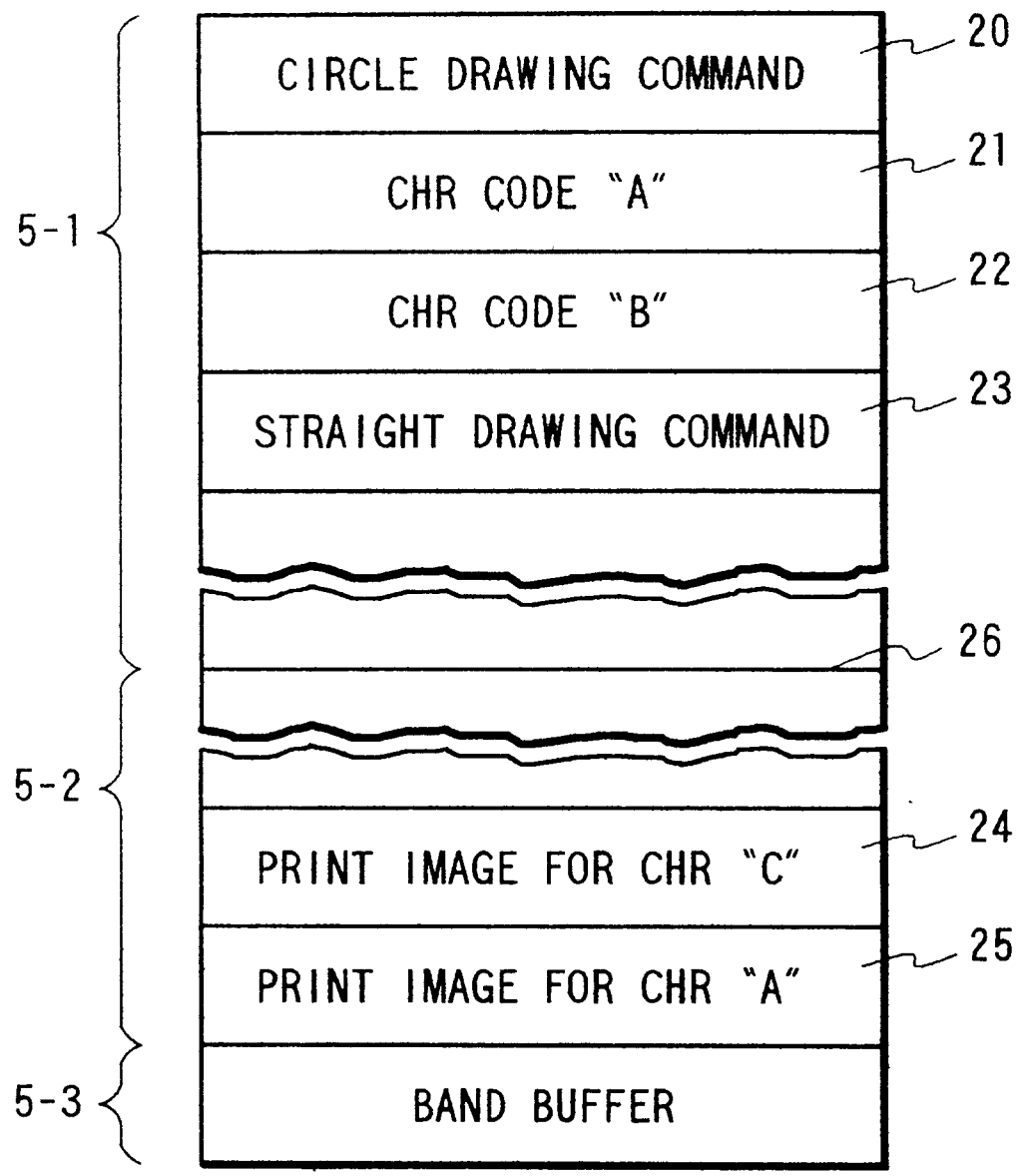
FIG. 2 is a chart illustrating the internal structure of a memory device 5 in an example 1.

FIG. 2 illustrates the memory contents of memory device (RAM) 5 of FIG. 1 in a normal state. The memory device 5 in the normal state is divided into the intermediate data memory (intermediate buffer) 5-1, the print image memory (cache buffer) 5-2, and the output print image memory (raster buffer) 5-3 of band size, by the memory location.

The intermediate data memory (intermediate buffer) 5-1 stores intermediate data generated from input data received in the receiver 3 in receiving order from the top of intermediate data memory 5-1.

The intermediate data may include a circle drawing command 20, a character code "A" 21 and a character code "B" 22 for a character drawing command, and a straight drawing command 23, for example, and is stored for each object with information of significantly smaller size than the actual print image.

For data such as character code 21 or character code 22, it takes much time to convert the character code into actual print image (character pattern). Thus, the print image for which it takes longer time to make the print image conversion is saved in the print image memory (cache buffer) 5-2 for reuse when the print image conversion is performed.

In the print image memory (cache buffer) 5-2 of FIG. 2, print image itself which has been converted from intermediate data is saved from the last of memory area.

The print image may include, for example, a print image 24 for character code "C" and a print image 25 for character code "A".

The intermediate data memory (intermediate buffer) 5-1 and the print image memory (cache buffer) 5-2 are consecutive memory areas, and delimited by a boundary 26.

The intermediate data saved in the intermediate data memory (intermediate buffer) 5-1 can not be deleted until at least one page has been stored, but the print image saved in the print image memory (cache buffer) 5-2 can be freely deleted in unused area of data if there is no free block.

Figure 3:
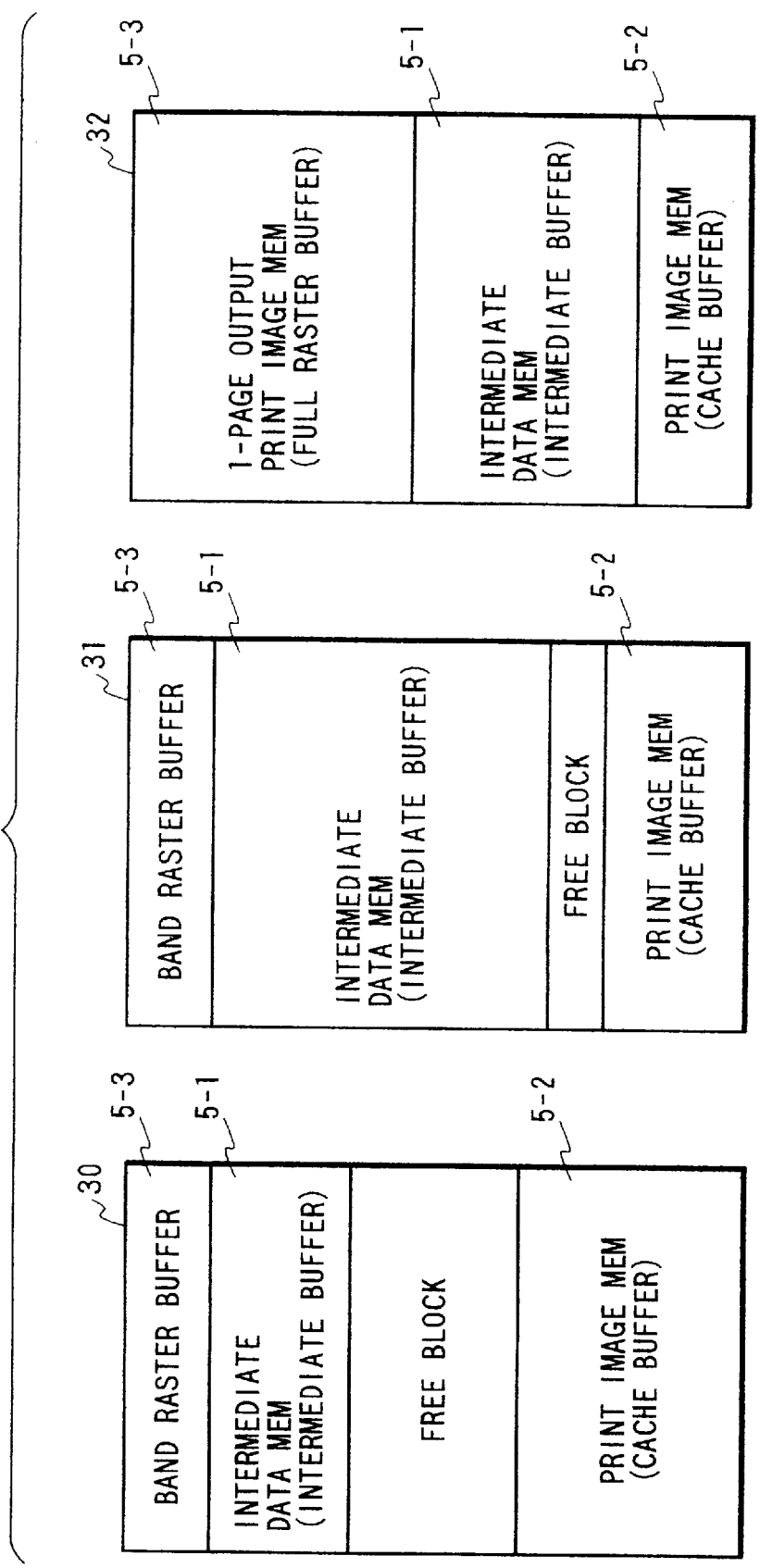
FIG. 3 is a transition diagram of memory area in the example 1.

FIG. 3 shows how to alter the capacity of each memory by a program in the memory controller 7, when the space capacity of memory device 5 is insufficient, and a process of reserving the output print image memory (raster buffer) 5-3 of one page.

30 shows a state where there is a sufficient space capacity of memory device 5. At this time, there exist the intermediate data memory (intermediate buffer) 5-1, the print image memory (cache buffer) 5-2, and the output print image memory (band raster buffer) 5-3 of band size which is smaller than one page.

31 shows a state where a free memory area is assigned to the intermediate data memory 5-1, because the intermediate data memory (intermediate buffer) 5-1 is increased, and short of necessary free memory, so that a part of the print image memory (cache buffer) 5-3 is deleted.

If necessary free area can not be reserved by deleting the control of print image memory (cache buffer) 5-2 as large as possible, the intermediate data memory (intermediate buffer) 5-1 can not be extended any more.

In this case, an output print image memory (full-raster buffer) 5-3 of one page is produced in accordance with the output size, to perform the image formation (rasterize) which is essentially made after completion of storing intermediate data of one page, partially for the intermediate data. It should be noted herein that since the output print image memory 5-3 becomes very large in size if the image formation is performed at an inherent output resolution or gradation, a degraded image with lower resolution or gradation is produced and stored so that the size of output print image memory 5-3 may be smaller than the total capacity of memory device.

By forming (rasterizing) the image from all intermediate data saved in the intermediate data memory (intermediate buffer) 5-3, and expanding it in the output print image memory (full-raster buffer) 5-3 of one page, the intermediate data memory (intermediate buffer) 5-1 can be all deleted to reserve a free memory area. And after deleting intermediate data, subsequent intermediate data is memorized in the free memory area of memory device to continue processing.

Figure 4:
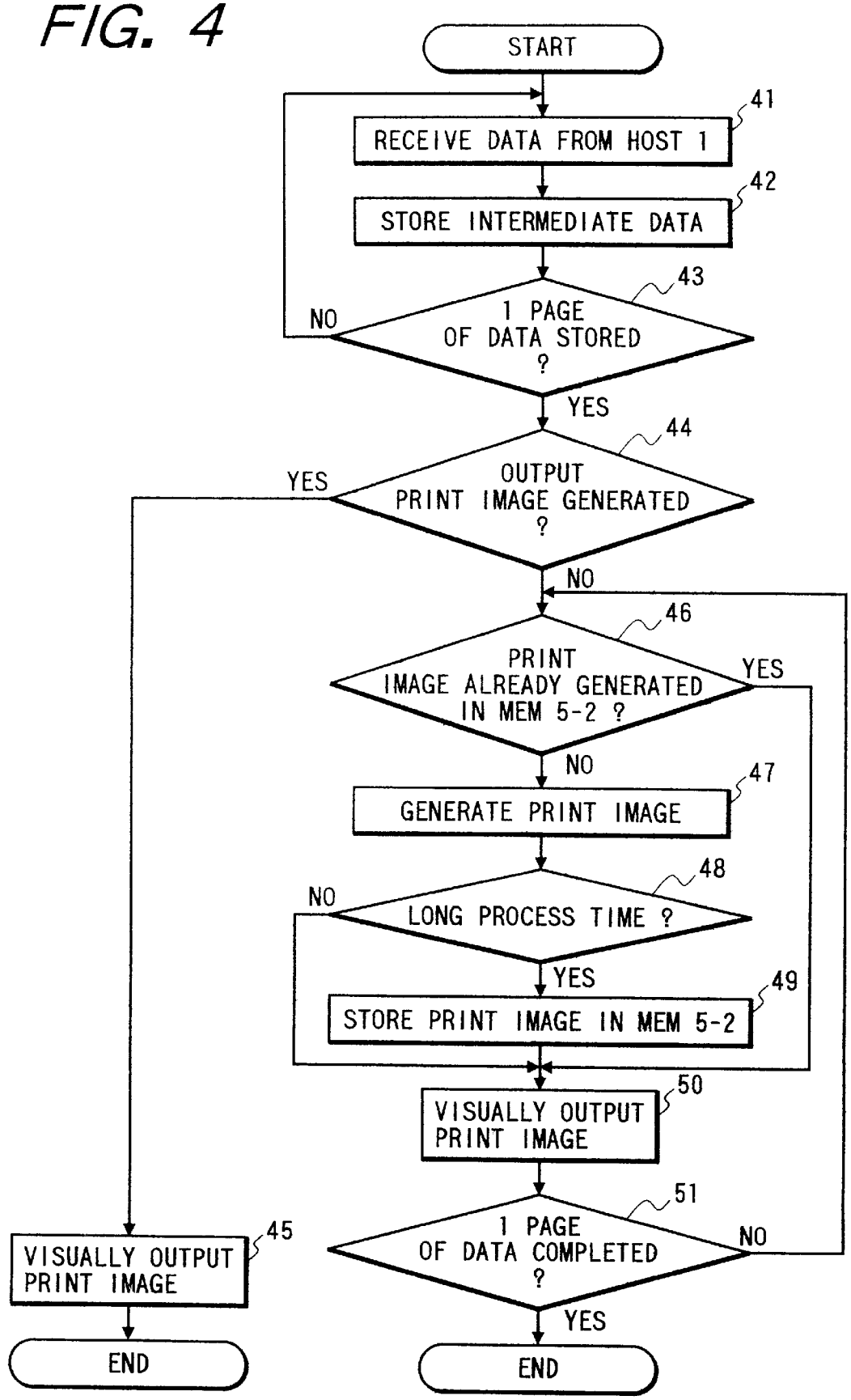
FIG. 4 is a flowchart showing a control program from print data generation up to the output of visual image.

FIG. 4 is a flowchart showing a data control program from the reception of input data to the output of visual image, which program is stored in the control program memory 4-2. And the control unit (CPU) 6 execute this control program in the following way.

First, at step 41, the receiver 3 receives input data from the host computer 1 via the interface 2. The CPU 6 transforms the received input data into intermediate data and stores intermediate data in the intermediate data memory (intermediate buffer) 5-1 at step 42. Then, it executes a program of the memory controller 7, if necessary, to alter the size of intermediate data memory 5-1. And at step 43, the CPU 6 determines whether or not the intermediate data of one page has been saved, for example, by investigating a paper exhausting instruction, and if intermediate data of one page has not been saved, the procedure returns to step 41.

If intermediate data of one page has been saved, the CPU 6 determines whether or not the output print image memory (full-raster buffer) 5-3 of one page is already created, due to insufficient capacity of memory device, at step 44. If it is already created, print image stored in the output print image memory 5-3 of one page is output as visual image with a specific resolution (e.g., 300 dpi) (or degraded print) at step 45, and the band raster buffer is reserved again after completion of printing.

If print image is not yet generated at the time of step 44, a process of converting (rasterizing) intermediate data (objects) one after another into actual print image is performed.

At step 46, the CPU 6 determines whether or not intermediate data of interest has been already formed and saved as print image in the print image memory (cache buffer) 5-2, and if print image has been already formed, that print image is reused to form and output visual image at step 50, and stored in the band raster buffer 5-3.

If intermediate data of interest has not been yet formed into print image, intermediate data is rasterized to form print image at step 47. If it is determined at step 48 that intermediate data requires a long time in the print image generating (rasterize) process, print image after formation is saved in the print image memory (cache buffer) 5-2 at step 49. Note that the print image formation (rasterize) process time is derived by referring to a table indicating the processing time for every object.

At step 50, print image generated is output visually. And at step 51, it is determined that all intermediate data of one page has been noticed, and if there remain any intermediate data of one page not output visually, the next intermediate data is noticed and the procedure returns to step 46.

In this way, for the intermediate data requiring much time to form (rasterize) print image, data which has once undergone formation of print image is saved in the print image memory (cache buffer) 5-2, and reused, whereby it is possible to have less dead time for the print image formation process and shorten the whole time for print image formation process.

Figure 5:
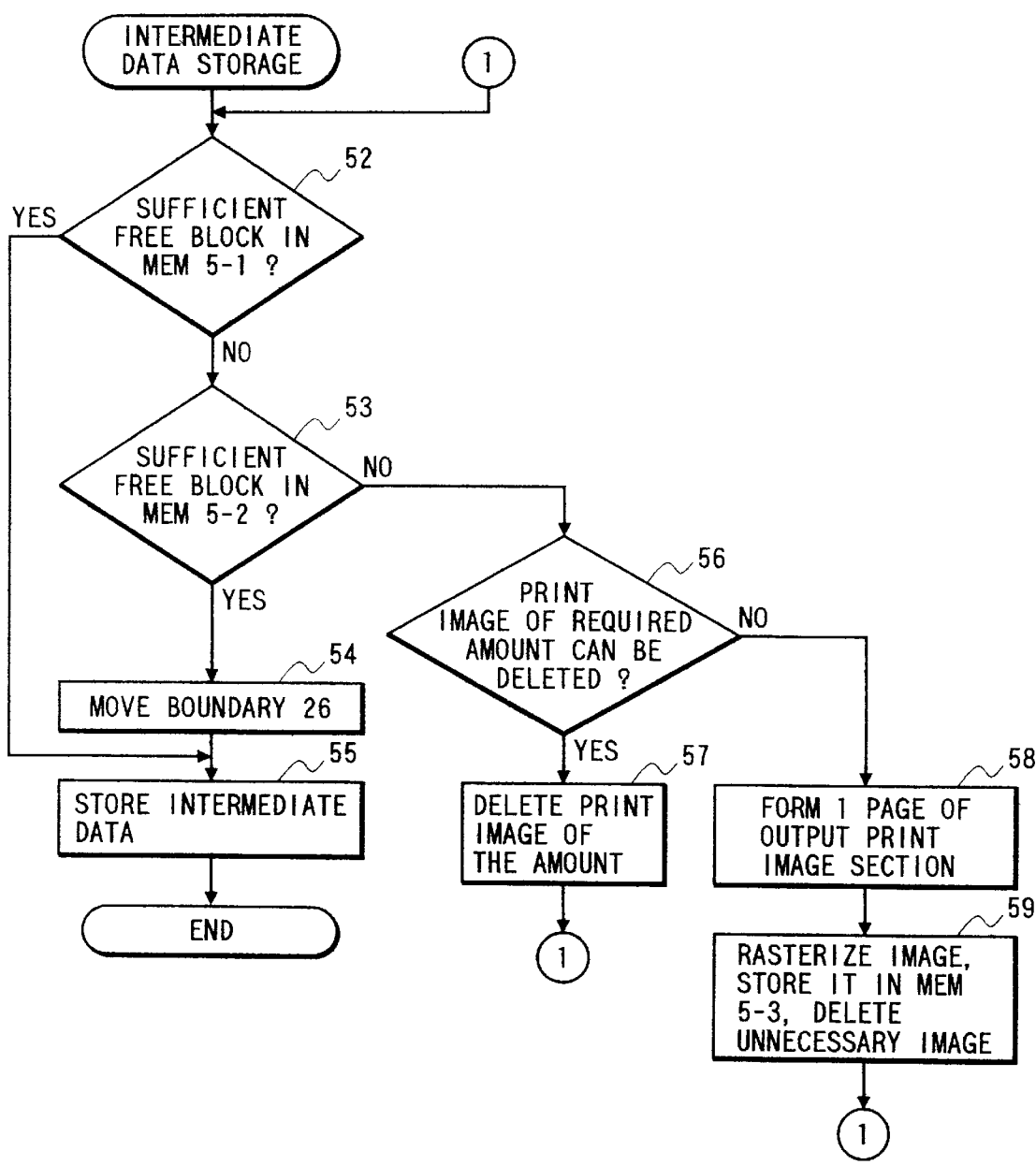
FIG. 5 is a flowchart showing a control program in a memory controller at a print data storing step 42 in FIG. 4.

FIG. 5 is a flowchart showing a program stored in the memory controller 7 in the print data saving process at step 42 in FIG. 4. And the CPU 6 executes this program in the following way.

When the intermediate data generated from input data received by the receiver 3 is saved in the intermediate data memory (intermediate buffer) 5-1, the CPU 6 determines whether or not there is any free block of the size required to save intermediate data in the intermediate data memory (intermediate buffer) 5-1 at step 52, and if there is any necessary free block, the intermediate data is actually saved at step 55.

If the intermediate data to be saved is of greater size than the free block of intermediate data memory 5-1, the CPU 6 determines at step 53 whether or not there is a larger free block in the print image memory (cache buffer) 5-2 than the intermediate data. If there is any free block, the boundary 26 between the intermediate data memory (intermediate buffer) 5-1 and the print image memory (cache buffer) 5-2 is moved toward the print image memory (cache buffer) 5-2 by the amount corresponding to the size of intermediate data to be saved at step 54, and the intermediate data is saved at step 55.

If there is no free block necessary for both the intermediate data memory (intermediate buffer) 5-1 and the print image memory (cache buffer) 5-2, the CPU determines whether or not print image can be deleted by the amount corresponding to insufficient memory area, and if possible, print image of that amount is deleted from the cache buffer 5-2 at step 57, and the procedure is repeated from step 52.

If there is insufficient free memory area necessary to save intermediate data of one page after all print image of that amount is deleted, an output print image section (full-raster buffer) 5-3 of one page is created at step 58, the image is formed (rasterized) based on the intermediate data already saved so that the image size after forming the image may be smaller by changing the resolution (e.g., from 600 dpi to 300 dpi) at step 59, and contained in the output print image memory (full-raster buffer) 5-3, and further unnecessary intermediate data/print image is deleted. Thereby, all intermediate data and print data can be deleted, so that the free memory area is increased, and the procedure returns to step 52 to retry the saving process of intermediate data as originally required. Note that if the output print image of one page is fed to the print engine 9, the raster buffer of one page becomes a band raster buffer.

Figure 6:
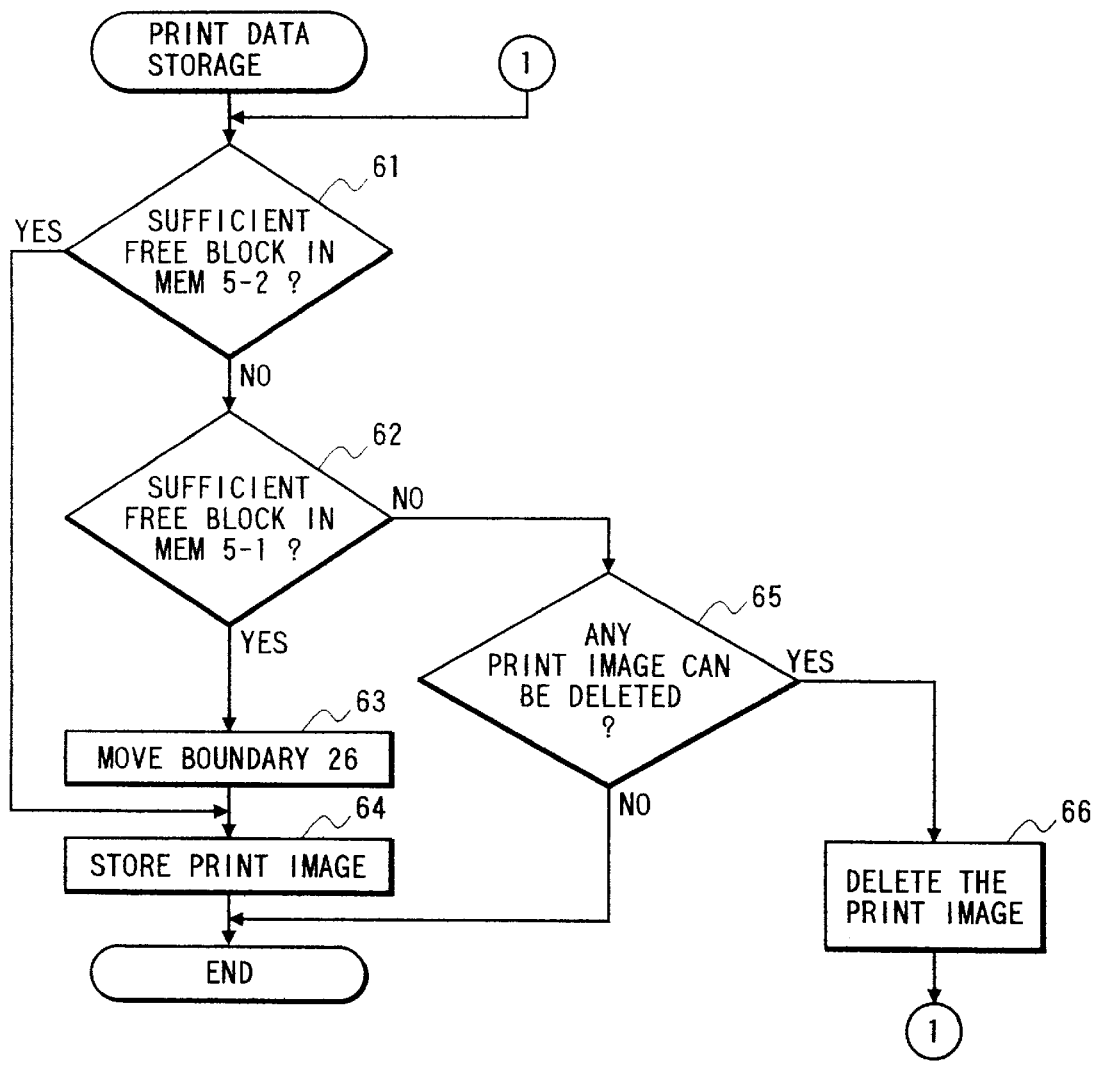
FIG. 6 is a flowchart showing a control program in the memory controller 7 at a print image storing step 49.

FIG. 6 is a flowchart showing a program stored in the memory controller 7 in a print image saving (cache) process. And the CPU 6 executes this program in the following way.

First, at step 61, the CPU 6 determines whether or not the free block of print image memory (cache buffer) 5-2 is greater than the size of print image to be saved, and if there is any free area large enough to save the print image, the print image is saved at step 64.

If there is less free area necessary in the print image memory (cache buffer) 5-2, the CPU 6 determines whether or not there is any free area necessary in the intermediate data memory (intermediate buffer) 5-1 at step 62. And if there is less free area in the intermediate data memory (intermediate buffer) 5-1, the CPU 6 determines whether or not unnecessary print image can be deleted.

And if there is any print image that can be deleted, the print image is deleted at step 66, and the saving process is retried at step 61.

Also, if sufficient area for the print image to be saved can not be reserved after the deletion of all the print image that can be deleted, it is abandoned to save its print image, and the process is ended. Note that a technique for reserving the free area of intermediate data memory (intermediate buffer) 5-1 has been described in the above example, but can be also applied when the free area of reception buffer is reserved.

As above described, according to the present invention, the memory area for intermediate data, print image for reuse, and output print image can be managed, with the effect that the print image forming (rasterize) time can be shortened owing to reuse of print image.

Also, a multi-value color printing apparatus can have the same effect realized by decreasing the gradation, rather than lowering the resolution, to reduce the output image size.

EXAMPLE 2

In the following, an example 2 of the present invention will be described, wherein FIG. 1 shows a schematic diagram of a printing system in this example 2.

Figure 7:
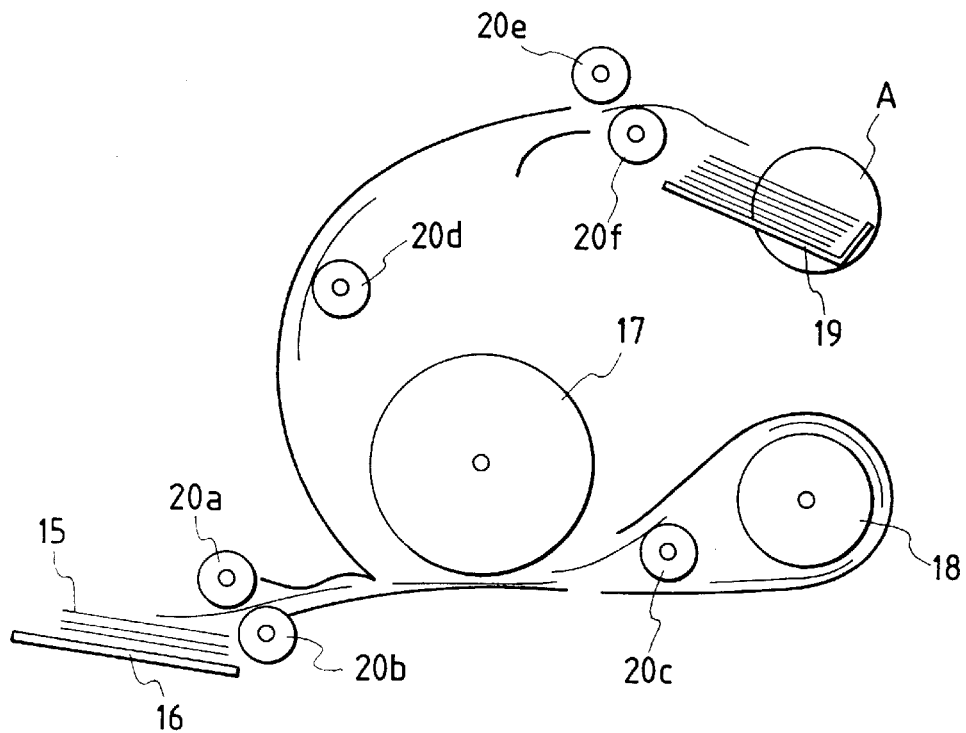
FIG. 7 is a view showing the details of a recording medium control unit.

Note that in the example 2, there is a recording medium controller 11 as shown in FIG. 7 within a printer engine 9, the capacity of a memory device 5 being set to a value allowing for the perfect printing.

The recording medium controller 11 of FIG. 7 controls on which side of a recording sheet the visual image is formed, the front side or back side of the recording sheet as the recording medium.

First, after intermediate data is stored in the intermediate data memory 5-1, by the number of pages that can be output (e.g., two pages consisting of front and back sides), the CPU 6 transforms (rasterizes) these intermediate data into print image using a print image generator 4-1, and sends out the print image to an output unit 8. The recording medium controller 11 controls the recording sheet such that print image formed may correctly accord with the front or back of the recording sheet, and a printer engine 8 outputs the visual image on the recording sheet, upon setting the recording sheet on the printer engine 8.

Note that if the print image is formed, the controller (CPU) 6 allows the print image which has been formed to be saved in the print image memory (cache buffer) 5-2, regarding the intermediate data from which the same print image may be possibly generated multiple times. And by reusing the print image saved in the print image memory (cache buffer) 5-2, when processing the intermediate data requiring formation of the same print image again, the total time taken for the conversion of print image is shortened, without forming the print image.

FIG. 7 is a constitutional view showing in detail the recording medium controller 11 within the printer engine 9, wherein the recording medium controller 11 comprises a paper supply tray 16 for containing the recording sheets 15, a printing drum 17 for printing desired image on both of front and back sides of recording sheet 15, a reversing unit 18 for reversing the face of recording sheet 15, a paper exhausting tray 19 for accommodating the recording sheet 15 having desired image printed on both of front and back sides, and an appropriate number of guide rollers 20a to 20f.

In the recording medium controller 11 as above described, unused recording sheet 15 contained in the paper supply tray 16 is conveyed via guide rollers 20a, 20b to the printing drum 17, which prints on one side of the recording sheet 15. Then, the recording sheet 15 is conveyed via a guide roller 20c to the reversing unit 18, which reverses the face of recording sheet 15, and then to the printing drum 17 again, which prints a desired image on the back side of the recording sheet 15. In this way, the recording sheet 15 having desired images printed on both of front and back sides is exhausted via the guide rollers 20d to 20f to the paper exhausting tray 19.

Figure 8:
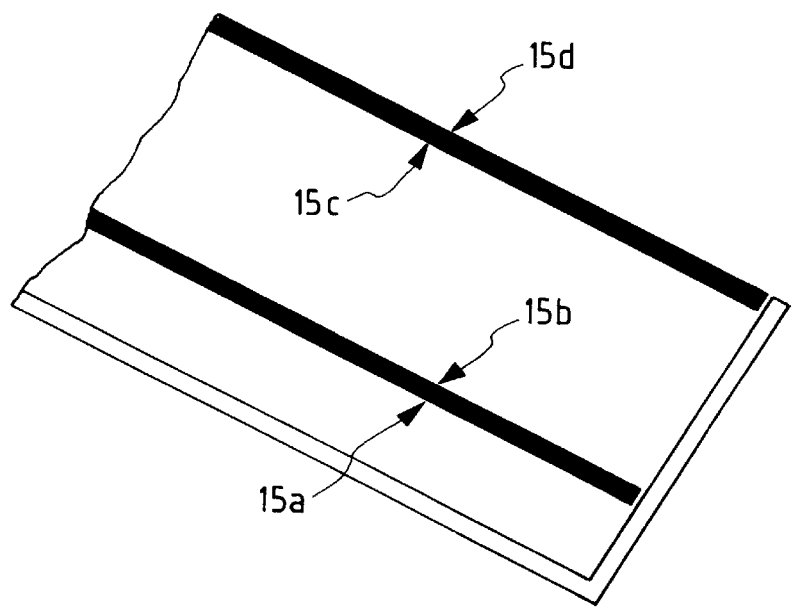
FIG. 8 is a view showing the details of A portion as shown in FIG. 7.

FIG. 8 is an enlarged view of A portion as shown in FIG. 7. The recording medium controller 11 has a first mode in which 15a is the first page, 15b is the second page, 15c is the third page and 15d is the fourth page in the recording sheet 15, and a second mode in which 15a is the second page, 15b is the first page, 15c is the fourth page and 15d is the third page in the recording sheet 15, whereby the desired images are printed on both sides of the recording sheet in either the first mode or second mode. Also, in both the first mode and the second mode, the recording sheet is accommodated within the paper exhausting tray 19 such that the first print face may lie on the upper side in the printing process which is performed twice. Thus, when printing in the first mode, the recording sheet 15 has even page on the upper side in the paper exhausting tray 19, in which the printing order in the printing drum 17 is different from the page order, i.e., the order of the second page, first page, fourth page and third page. Also, when printing in the second mode, the recording sheet 15 has odd page on the upper side in the paper exhausting tray 19, in which the printing order in the printing drum 17 is coincident with the page order, i.e., the order of the first page, second page, third page and fourth page. In this case, the controller (CPU) 6 controls the printer engine 9 containing the recording medium controller 11 to form and output the visual image, when two pages of intermediate data are stored in the intermediate data memory (intermediate buffer) 5-1.

Figure 9:
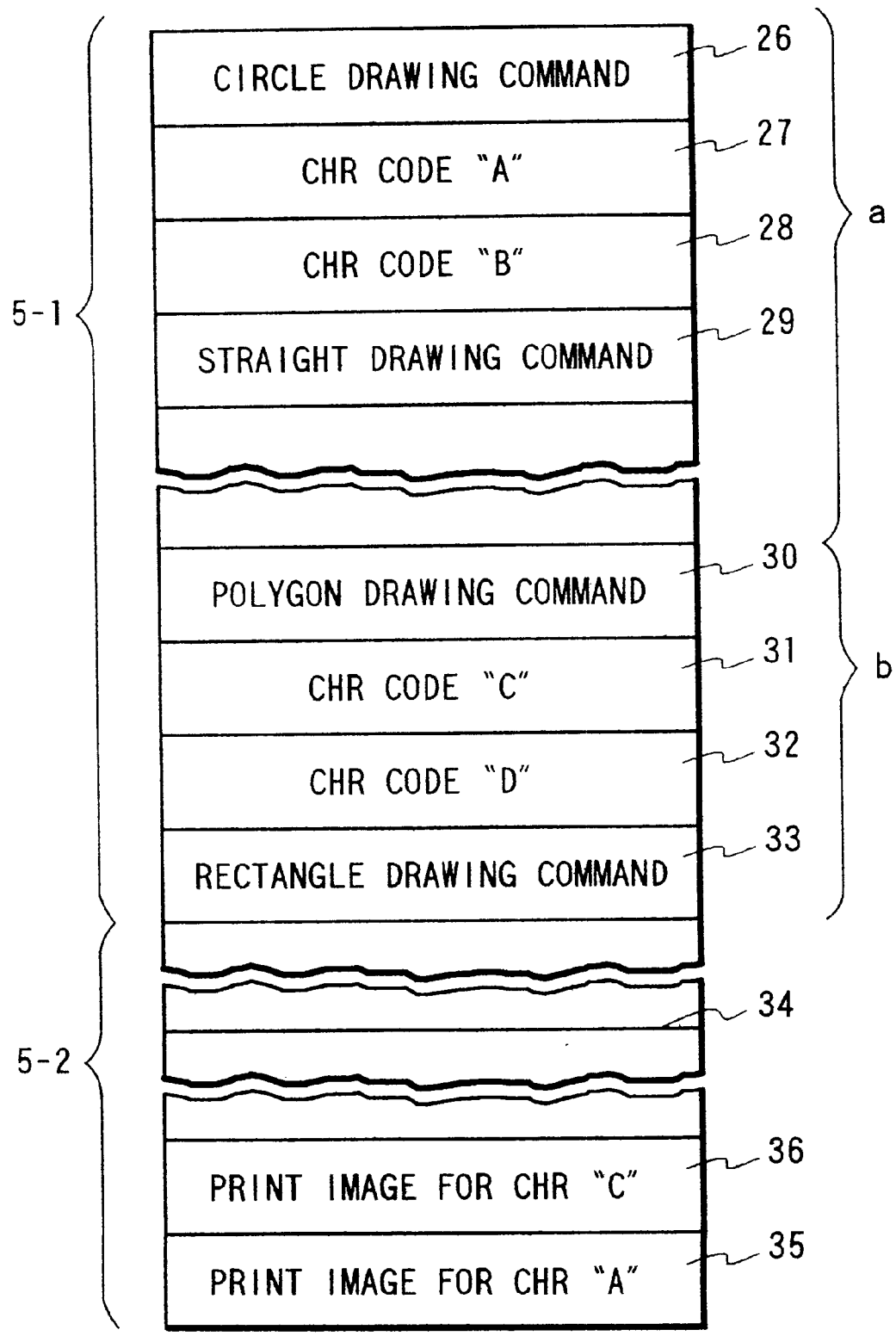
FIG. 9 is a chart illustrating the internal structure of a memory device 5 in an example 2.

FIG. 9 is a map chart showing the memory contents stored in the memory device 6 in a normal state, wherein the memory device (RAM) 5 has consecutive memory areas as described in the example 1, which are normally divided into a first memory area of intermediate data memory (intermediate buffer) 5-1 and a second memory area of print image memory (cache buffer) 5-2 at a boundary 34, with no output print image memory (raster buffer) 5-2 formed.

The intermediate data memory (intermediate buffer) 5-1 stores intermediate data which is converted from input data received by the receiver 3 into easily manageable format in receiving order from the top of intermediate data memory (intermediate buffer) 5-1. For example, as shown in FIG. 9, intermediate data a of the first page has memorized a circle drawing command 26, a character code "A" 27 and a character code "B" 28 as a character drawing command, and a straight drawing command 29 in order, and intermediate data b of the second page has memorized a polygon drawing command 30, a character code "C" 31 and a character code "D" 32 and a rectangle drawing command 33 in order. Note that these intermediate data are stored with the capacity of significantly smaller size than the print image.

The character drawing commands such as character code "A" 27 or character code "B" 28 are saved in the print image memory (cache buffer) 5-2 at the time when they were converted into print image in the past, because it takes longer time to convert (rasterize) such character code into print image. That is, in the print image memory (cache buffer) 5-2, the print image which has been converted from intermediate data is saved from the last of second memory area, such as a character "A" print image or a character "C" print image 36.

The intermediate data saved in the intermediate data memory (intermediate buffer) 5-1 can not be deleted until the print image of one page of interest has been output, whereas the print image saved in the print image memory (cache buffer) 5-2 can be freely deleted in unused area of data if there is no free block in the memory area of intermediate data, to extend the memory area of intermediate data.

Thus, the memory controller 7 manages and alters at any time the capacity ratio (area ratio) of the intermediate data memory (intermediate buffer) 5-1 and the print image memory (cache buffer) 5-2 as described in the example 1, as well as storing a program for forming the output print image memory (raster buffer) 5-2 inside the memory device 5.

FIGS. 10A to 10E, 11A to 11E and 12A to 12E are map charts showing the state where the capacity of each memory 5-1, 5-2, 5-3 is altered or reserved.

FIGS. 10A to 10E show how to alter the capacity of each memory as the free block within the memory device 5 is less sufficient, wherein the first page is created in the single or double side printing.

Figures 10A, 10B, 10C:
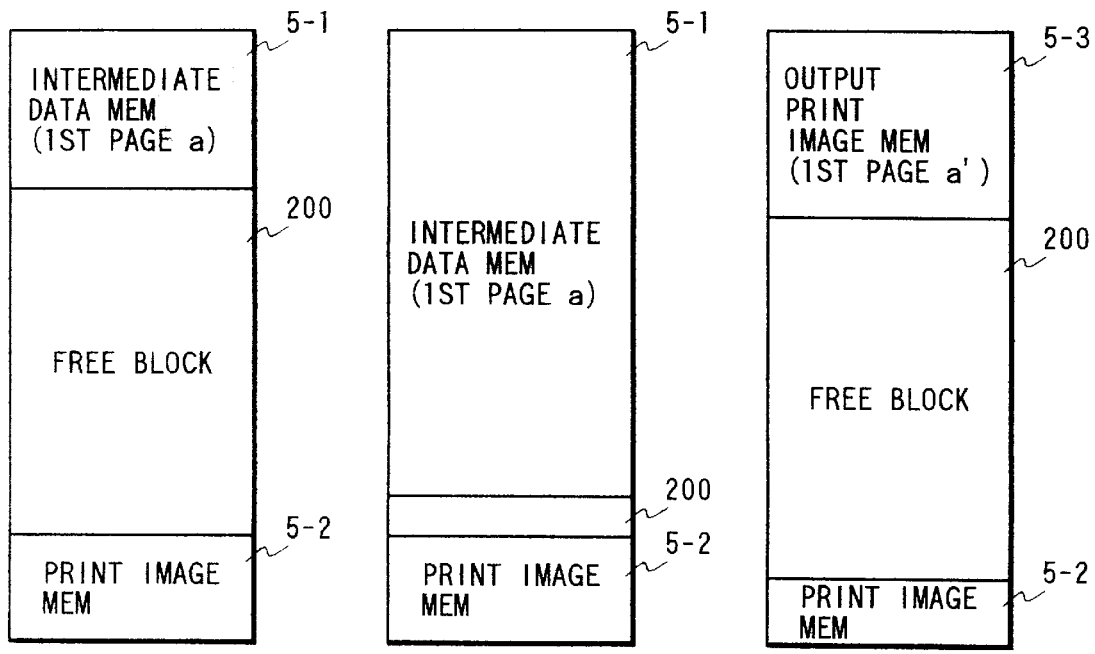
FIGS. 10A to 10E are transition diagrams of memory area in the example 2.

FIG. 10A shows the state where the free block of memory device 5 is sufficient, in which normally the intermediate data memory (intermediate buffer) 5-1 and the print image memory (cache buffer) 5-2 only exist, and no output print image memory (raster buffer) 5-3 exists, as shown in FIG. 10A. And the intermediate data memory 5-1 and the print image memory 5-2 in which the first page intermediate data a has been stored have a free block 200 where none of intermediate data and print image are yet stored.

Then, when the first page intermediate data a stored in the intermediate data memory 5-1 has a large volume and the free block is less sufficient, a part of unused area in the print image memory 5-2 is deleted if possible, as shown in FIG. 10B, thereby extending the boundary 34 to the area of the print image memory 5-2, as shown in FIG. 9.

Also, if the storage capacity of storing the first page intermediate data a is less sufficient, such that the first page intermediate data a generated is above half the capacity of the intermediate data memory 5-1 even by deleting the part of print image memory 5-2, the output print image memory 5-3 of one page is created in accordance with the output size, as shown in FIG. 10C. That is, the image formation (rasterize) which is essentially performed after intermediate data for all pages have been received is made partially for the first page intermediate data, whereby the abnormal termination caused by insufficient memory capacity is avoided. In this case, since the memory capacity of output print image memory 5-3 becomes very large if the image formation is made at an original output resolution (e.g., 600 dpi), the image is formed by lowering the resolution (e.g., from 600 dpi to 300 dpi) so that the memory capacity of output print image memory 5-3 may be made small, compared with the total capacity of memory device 5. That is, the degraded print image is formed.

In this way, the image formation (rendering) is made partially for the first page intermediate data a stored in the intermediate data memory 5-1, and expanded to the output print image memory 5-3, so that all the intermediate data memorized in the intermediate data memory 5-1 before can be deleted. Thereafter, the remaining first page intermediate data a is memorized in the intermediate data memory 5-1.

Figures 10D, 10E:
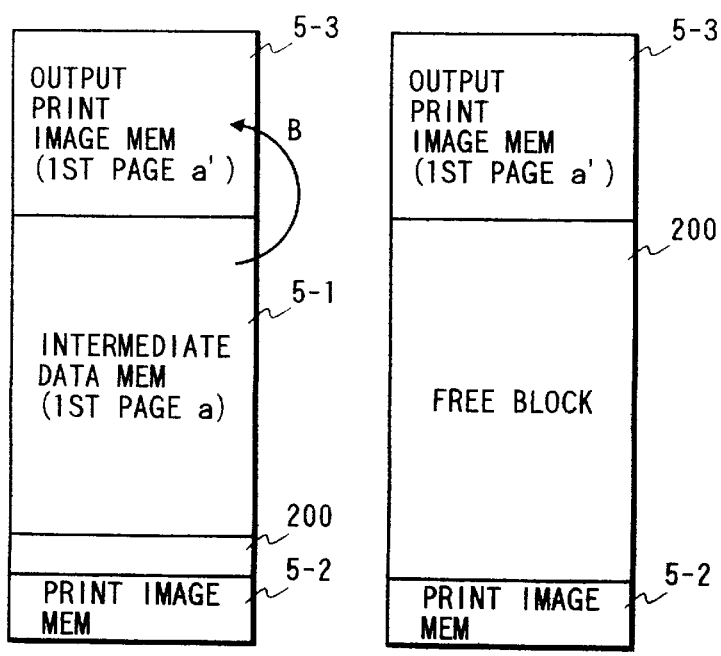

Then, if the amount of intermediate data further increases and the free block of intermediate data memory 5-1 decreases, the image formation (rasterize) is made for the first page intermediate data a memorized in the intermediate data memory 5-1, as shown in FIG. 10D, and the intermediate data is expanded to the output print image memory 5-3, as indicated by the arrow B, whereby the intermediate data memory 5-1 can be deleted to form a free block 200 and extend the memory area, as shown in FIG. 10E.

Also, if the intermediate data of first page has been stored in the intermediate data memory 5-1, all the intermediate data of first page is likewise converted into print image and stored in the output print image memory 5-3, whereby all the intermediate data in the intermediate data memory 5-1 can be deleted, and the memory contents memorized in the output print image memory 5-3 become the output print image a' of first page.

In the single side printing, by outputting visually the contents of output print image memory 5-3 in this state, its memory area can be deleted from the memory device 5, to allow the processing to be continued in the normal state. Accordingly, the single side printing can be guaranteed with a limited capacity of memory device.

FIGS. 11A to 11E show how to alter the capacity of each memory when printing the second page with the double side printing in the first mode.

Note that for the double side printing in the second mode, which occurs in the same order as creating the intermediate data, the creation of intermediate data is interrupted and the visual image for the page already created is output to increase the free block, if the free block 200 of memory device 5 is less sufficient.

FIG. 11A shows the state where the free block of memory device 5 is sufficient, in which normally the intermediate data memory 5-1 and the print image memory 5-2 only exist, and no output print image memory 5-3 exists, as shown in FIG. 11A. And the intermediate data memory 5-1 and the print image memory 5-2 in which the first page and second page intermediate data a, b have been stored have a free block 200 where none of intermediate data and print image are yet stored.

Then, if the second page intermediate data b stored in the intermediate data memory 5-1 has a large volume and the free block is less sufficient, a part of unused area for the print image memory 5-2 is deleted if possible, as shown in FIG. 11B, extending the boundary 34 to the area of the print image memory 5-2, as shown in FIG. 9.

Also, if the storage capacity of storing the intermediate data is less sufficient, such that the free block enough to memorize the second page intermediate data received can not be reserved even by deleting a part of print image memory 13, the output print image memory 5-3 of second page b is created in accordance with the output size, as shown in FIG. 11C. That is, the image formation which is essentially performed after intermediate data for all pages have been generated is made partially for the second page intermediate data, whereby the abnormal termination caused by insufficient memory capacity is avoided. In this case, since the memory capacity of output print image memory 5-3 becomes very large if the image formation is made at an original output resolution (e.g., 600 dpi), the image is formed by lowering the resolution (e.g., from 600 dpi to 300 dpi) so that the memory capacity of output print image memory 5-3 may be made small, compared with the total capacity of memory device 5, in the same way as described above and shown in FIGS. 10A to 10E. That is, the degraded print image is formed.

In this way, the image is formed partially for the second page intermediate data b stored in the intermediate data memory 5-1, and expanded to the output print image memory 5-3, so that all the second page intermediate data memorized in the intermediate data memory 5-1 can be deleted. Thereafter, the remaining second page intermediate data 12b is memorized in the intermediate data memory 5-1.

Then, if the amount of intermediate data further increases and the free block of intermediate data memory 5-1 decreases, the image formation (rasterize) is made for the second page intermediate data b memorized in the intermediate data memory 5-1, as shown in FIG. 11D, whereby the intermediate data is expanded to the output print image memory 5-3, as indicated by the arrow C, and the second page intermediate data b of the intermediate data memory 5-1 is deleted to form a free block 200, as shown in FIG. 11E.

Also, when the intermediate data of second page b has been stored in the intermediate data memory 5-1, all the intermediate data is likewise formed as the image, which is stored in the output print image memory 5-3, thereby all the intermediate data in the intermediate data memory 5-1 can be deleted, and the memory contents memorized in the output print image memory 5-3 become the output print image b' of second page.

In this state, by outputting visually the first page intermediate data a and the second page output print image b', its memory area can be deleted from the memory device 5, to allow the processing to be continued in the normal state. Accordingly, the double side printing can be guaranteed with a limited capacity of memory device. While in the above description, the memory capacity of intermediate data memory for storing the intermediate data of second page was judged, it will be appreciated that the capacity of intermediate data memory of first page may be judged.

FIGS. 12A to 12E show how to alter the capacity of each memory to perform the printing process for the second page, when the first page is created as the output print image a' but not the intermediate data, wherein the double side printing is made in the first mode.

Figure 12A:
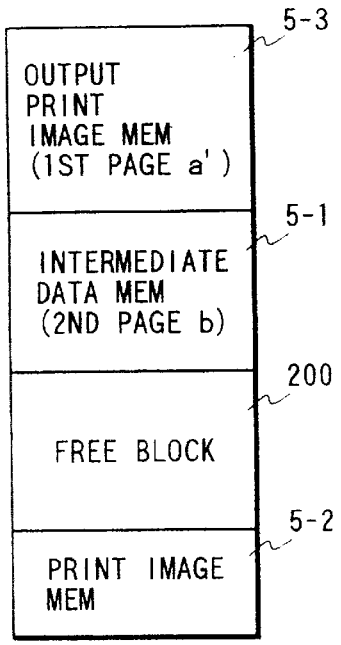
FIGS. 12A to 12E are another transition diagrams of memory area in the example 2.

FIG. 12A shows the state where the free block of memory device 5 is sufficient, in which at first the output print image memory 5-3 where the first page output print image a' is stored and the intermediate data memory 5-1 and the print image memory 5-2 where the second page intermediate data b is stored are formed, and the intermediate data memory 5-1 and the print image memory 5-2 where the second page intermediate data b is stored has a free area 200 where none of intermediate data and print image are stored, as shown in FIG. 12A.

Figure 12B:
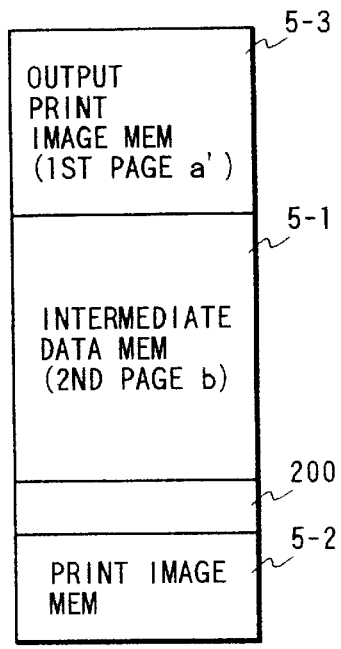

Then, if the second page intermediate data b stored in the intermediate data memory 5-1 has a large volume and the free block is less sufficient, a part of unused area for the print image memory 5-2 is deleted if possible, as shown in FIG. 12B, extending the boundary 34 to the area of the print image memory 5-2, as shown in FIG. 9.

Figure 12C:
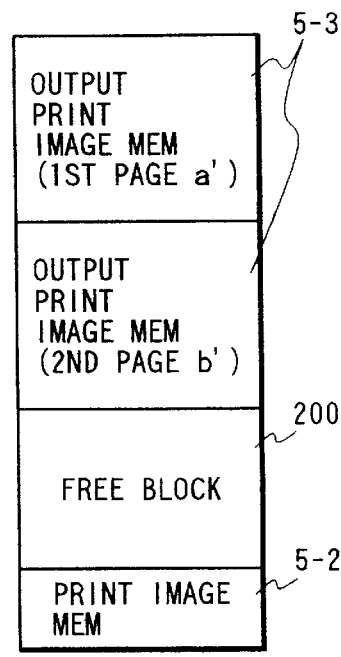

Also, if the storage capacity of storing the intermediate data is less sufficient, such that the free block 200 enough to memorize the second page intermediate data b generated can not be reserved even by deleting a part of print image memory 5-2, the output print image memory 5-3 of second page b' is created in accordance with the output size, as shown in FIG. 12C. That is, the image formation (rasterize) which is essentially performed after intermediate data for all pages have been generated is made partially for the second page intermediate data, whereby the abnormal termination caused by insufficient memory capacity is avoided. In this case, since the memory capacity of output print image memory 5-3 becomes very large if the image formation is made at an original output resolution (e.g., 600 dpi), the image is formed by lowering the resolution (e.g., from 600 dpi to 300 dpi) so that the memory capacity of output print image memory 5-3 or the sum of the first and second output print images a', b' may be made small, compared with the total capacity of memory device 5, in the same way as described above and shown in FIGS. 10A to 11E. That is, the degraded print image is formed.

In this way, the image is formed partially for the second page intermediate data b stored in the intermediate data memory 5-1, and saved in the output print image memory 5-3, so that all the intermediate data memorized in the intermediate data memory 5-1 can be deleted. Thereafter, the remaining second page intermediate data a is memorized in the intermediate data memory 5-1.

Figure 12D:
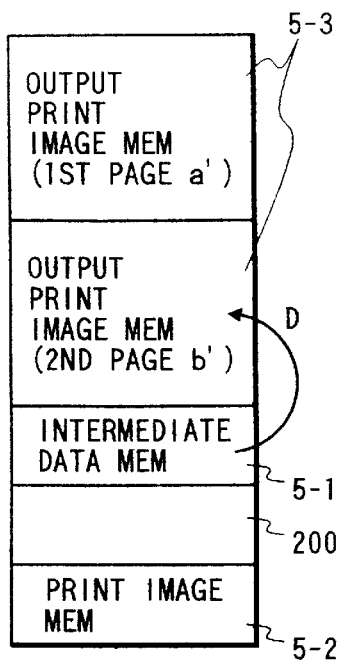
Figure 12E:
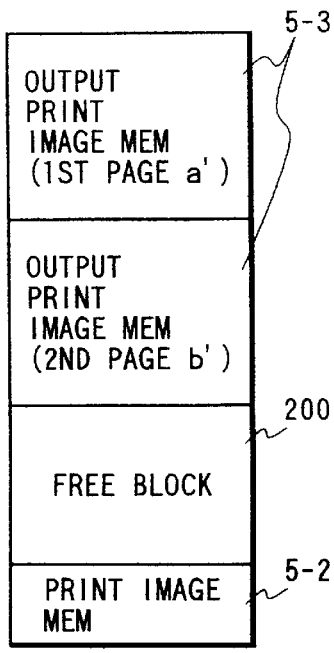

Then, if the amount of intermediate data further increases and the free block of intermediate data memory 5-1 decreases, the image formation (rasterize) is made for the second page intermediate data b memorized in the intermediate data memory 5-1, as shown in FIG. 12D, whereby the print image is stored in the output print image memory 5-3, as indicated by the arrow D, and the intermediate data memory 5-1 is deleted to form a free block 200, as shown in FIG. 12E.

Also, when the intermediate data of second page has been stored in the intermediate data memory 5-1, all the intermediate data is likewise converted into print image, and stored in the output print image memory 5-3, whereby all the intermediate data in the intermediate data memory 5-1 is deleted, and the memory contents memorized in the output print image memory 5-3 become the output print image b' of second page.

In this state, by outputting visually the first page output print image data a' and the second page output print image data b', its memory area can be deleted from the memory device 5, to allow the processing to be continued in the normal state. Accordingly, the double side printing can be guaranteed with a limited capacity of memory device.

In this way, with the example 2, the perfect printing apparatus makes use of the memory areas for the intermediate data, print image for reuse, and output print image, as above described, the formation time of print image can be shortened owing to reuse of print image, and for the pages having large data amount, the desired printing can be also effected without causing interruption of printing process, due to insufficient capacity of memory device.

Note that the present invention is not limited to the above example. For instance, in the above example, the print image is stored in the output print image memory 5-3 with the resolution reduced to avoid lower capacity for the print image, but it should be noted that if the color printing function is provided, the lower capacity for the print image can be avoided by lowering the gradation, instead of reducing the resolution. That is, by creating the degraded print image having the resolution and/or gradation reduced, the printing process can be guaranteed with a limited capacity of memory device.

Also, while in the example 2, it is determined whether or not the memory capacity is less sufficient for the intermediate data for the single side of the recording sheet 15 which will undergo the perfect printing, it will be appreciated that it may be also determined whether or not the memory capacity is less sufficient relative to the amount of intermediate data for the both sides of the recording sheet 15, wherein the capacity of memory device 5 can be appropriately set in the design step of the apparatus, thereby avoiding the insufficient memory capacity occurring while the apparatus is working, to which the present invention can be also effectively applied.

Figure 13:
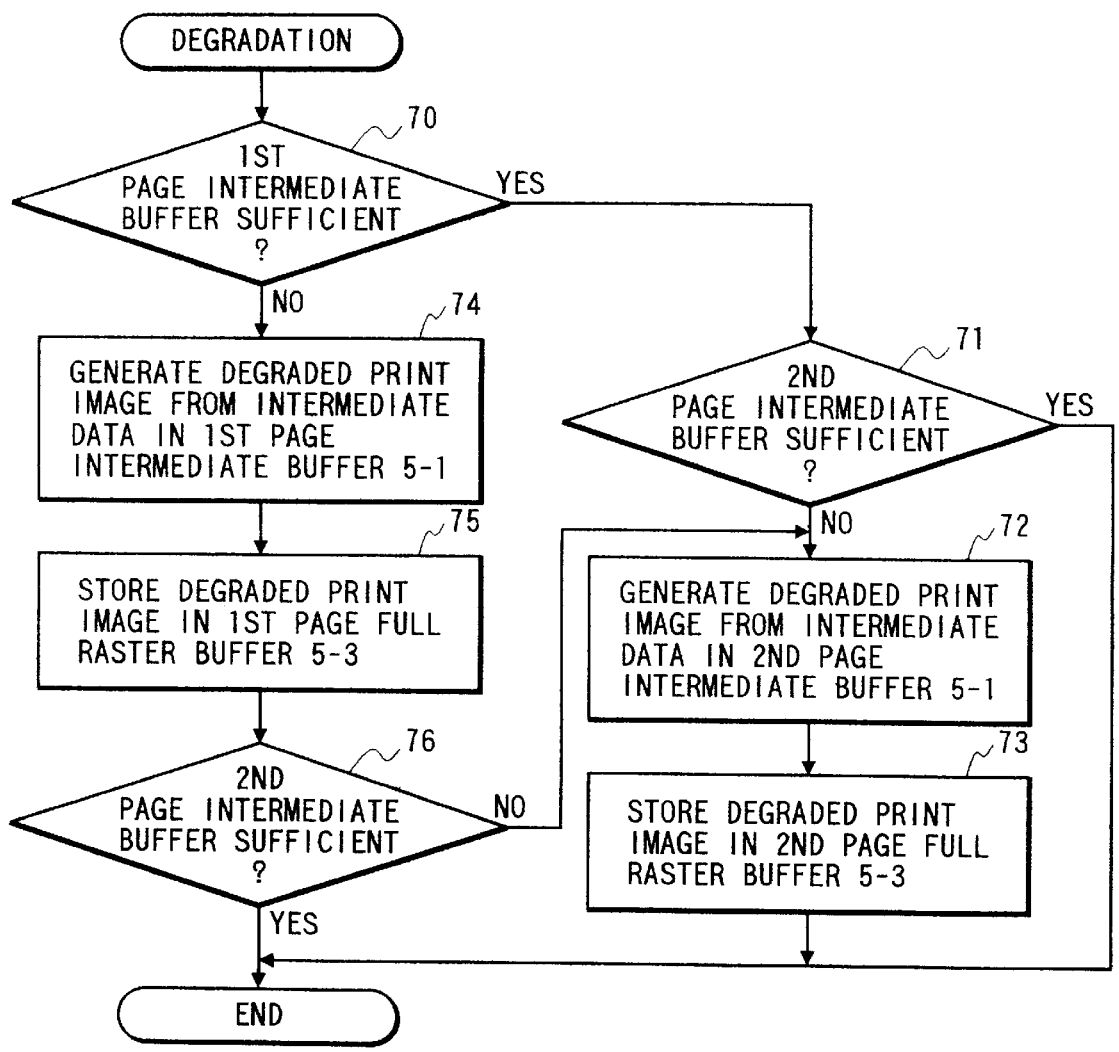
FIG. 13 is a flowchart showing a control program for a degradation process in the example 2.

A specific example will be briefly described using a flowchart of FIG. 13. FIG. 13 is a control program schematically showing a degrade process as described in FIGS. 11A to 12E, which is stored in a control program memory 4-2 as shown in FIG. 1.

And this program is executed by the CPU 6 to perform the following operation.

First, at step 70, the CPU 6 determines whether or not the first page intermediate buffer 5-1 is insufficient, and if it is not insufficient, the CPU 6 further determines at step 71 whether or not the second page intermediate buffer 5-1 is insufficient.

If at step 71 the second page intermediate buffer 5-1 is determined to be insufficient, the CPU 6 creates (rasterizes) a degraded print image with the resolution and/or gradation reduced from the intermediate data stored in the second page intermediate buffer 5-1.

And the full-raster buffer 5-3 for the second page is reserved to store the degraded print image created, which is then subjected to the printing process.

Accordingly, the first page intermediate data is reaterized still at high quality without lowering the resolution and/or gradation, stored in the band raster buffer 5-3 reserved, and subjected to the printing process, while the second page intermediate data is rasterized to have a degraded print image with the resolution and/or gradation reduced, stored in the full-raster buffer 5-3 reserved, and subjected to the printing process, whereby the perfect printing can be guaranteed with a limited memory capacity.

On the other hand, at step 70, if the CPU 6 determines that the intermediate buffer 5-1 for the first page is insufficient, the degraded print image with the resolution and/or gradation reduced is created (rasterized) from the intermediate data stored in the first page intermediate buffer 5-1. And at step 75, the first page full-raster buffer 5-3 is reserved to store the degraded print image created, and the CPU 6 determines at step 76 whether or not the second page intermediate buffer 5-1 is insufficient.

At step 76, if the second page intermediate buffer 5-1 is insufficient, the steps 72 and 73 as above are executed.

Accordingly, the first page and second page intermediate data are rasterized to have degraded print images with the resolution and/or gradation reduced, stored in the first page full-raster buffer 5-3 and the second page full-raster buffer 5-3, respectively, and subjected to the printing process, whereby the perfect printing can be guaranteed with a limited memory capacity.

Also, at step 76, if the second page intermediate buffer 5-1 is not insufficient, the second page intermediate data is rasterized still at high quality without lowering the resolution and/or gradation, stored in the band raster buffer 5-3 reserved, and subjected to the printing process.

Accordingly, the first page intermediate data is rasterized to have degraded print image with the resolution and/or gradation reduced, stored in the full-raster buffer 5-3 reserved, and subjected to the printing process, whereby the perfect printing is guaranteed with a limited memory capacity.

EXAMPLE 3

An example 3 of the present invention will be described below, in which a printing system of the example 3 is shown schematically in FIG. 1.

Figure 14:
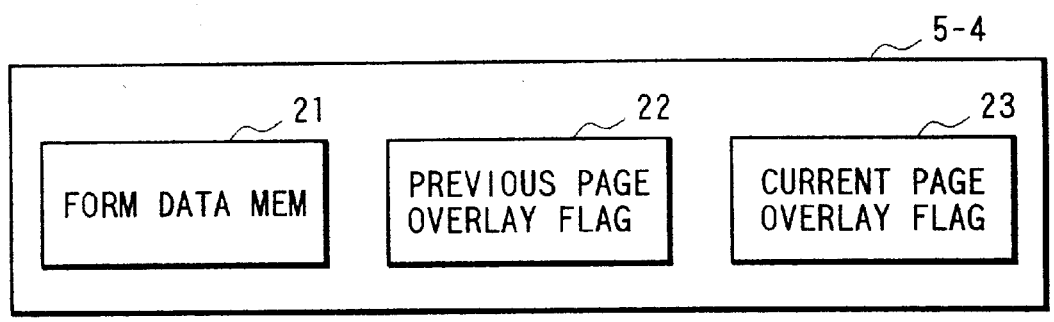
FIG. 14 is a diagram showing the specific structure of a work area 5-4 in an example 3.

Note that in the example 3, reference is made to FIG. 14 which shows the details of a work area 5-4 in FIG. 1.

An overlay unit with in th e work area 5-4 as shown in FIG. 14 has a form data memory 21 for memorizing overlay printing data (form data), a previous page overlay flag 22 indicating whether or not the previous page has been overlaid, and a current page overlay flag 24 indicating whether the current page has been already overlaid. That is, the previous page overlay flag 22 is set to "1" when an overlay request is received from the host computer 1, or when the previous page has been overlaid, or otherwise to "0", whereby the execution of overlay processing is determined based on the previous page overlay flag 22 when the memory area (intermediate buffer) 5-1 of the intermediate data is less sufficient in capacity. Also, the current page overlay flag 23 is set to "0" at the top of page, and to "1" at the end of overlay processing, whereby two or more overlay processing within one page can be avoided based on the current page overlay flag 23.

Herein, the above-mentioned form data is downloaded from the host computer 1 and memorized in the form data memory 21 in the format of intermediate data.

In the print control device 1 thus constituted, input data generated in the host computer 1 is sent via a predetermined communication network 2 to the print control device 100. The print control device 100 transforms input data received by the receiver 3 into intermediate data and saves it in the intermediate data memory 5-1 under control of the controller (CPU) 6.

In this case, the CPU 6 sends out the form data from the form data memory 21 to the intermediate data memory 5-1, with the current page overlay flag 14 set to "1", when the overlay is needed. Thereby, even when the overlay processing is requested again with the same page, the duplicate execution of the overlay processing can be prevented.

Next, after intermediate data of one page is stored in the intermediate data memory 5-1, the CPU 6 transforms (rasterizes) the intermediate data into print image, optionally using the print image generator 4, and sends out the print image to the output unit 8. And the output unit 8 outputs visually the print image received by means of the printer engine.

Note that in forming the print image, the controller 6 controls the print image after formation to be stored in the print image memory (cache buffer) 5-2, corresponding to the intermediate data from which the same print image is formed possibly multiple times. And in processing the intermediate data from which the same print image is necessary to be formed (rasterized) again, the total time needed for the conversion of print image can be shortened by making reuse of the print image saved in the print image memory (cache buffer) 5-2 without forming the print image.

Figure 15:
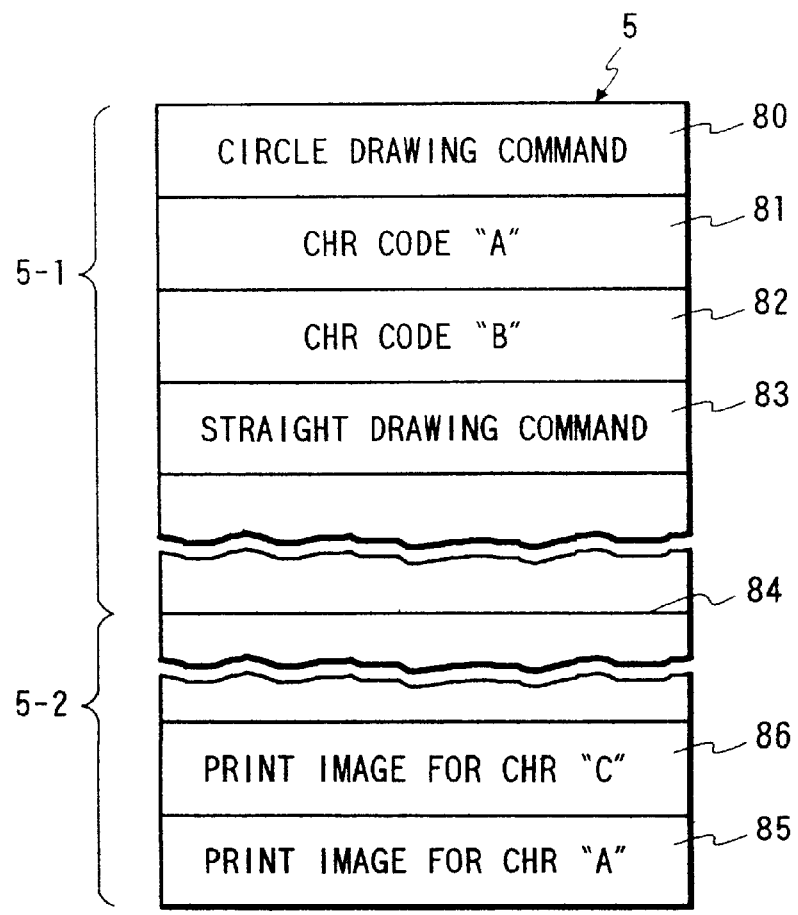
FIG. 15 is a diagram illustrating the internal structure of a memory device 5 in the example 3.

FIG. 15 is a map chart showing the memory contents stored in the memory device 5 in a normal state. That is, the memory device 5 has consecutive memory areas, which are normally divided into a first memory area of intermediate data memory 5-1 and a second memory area of print image memory 5-2 at a boundary 84, with no output print image memory 5-3 formed.

The intermediate data memory 5-1 stores intermediate data which is converted (rasterized) from input data received by the receiver 3 into easily manageable format in receiving order from the top of intermediate data memory 5-1. For example, as shown in FIG. 15, a circle drawing command 80, a character code "A" 81 and a character code "B" 82 as a character drawing command, and a straight drawing command 83 are memorized in order in the intermediate data memory 5-1. Note that these intermediate data are stored with the capacity of significantly smaller size than the print image for each object.

As for the character drawing commands such as character code "A" 81 or character code "B" 82, the print image obtained when they were converted into print image in the past is saved in the print image memory (cache buffer) 5-2, because it takes longer time to convert (rasterize) the character code into print image. That is, in the print image memory 5-2, the print image which has been converted from intermediate data is saved from the last of memory area, such as a character "A" print image 85 or a character "C" print image 86 as the character print image.

The intermediate data saved in the intermediate data memory 5-1 can not be deleted until the print image of one page at minimum has been stored, whereas the print image saved in the print image memory 5-2 can be freely deleted in unused area of data if there is no free block in the memory area 5-1 of intermediate data, thereby extending the memory area 5-1 of intermediate data.

Thus, the program within the memory controller 7 manages and alters at any time the capacity ratio (area ratio) of the intermediate data memory 5-1 and the print image memory 5-2, as well as forming the output print image memory 5-2 inside the memory device 5, and this program is executed by the CPU 6.

FIGS. 16A to 16E are map charts showing how the memory controller 7 can reserve or alter each area of memory device 5.

Figure 16A:
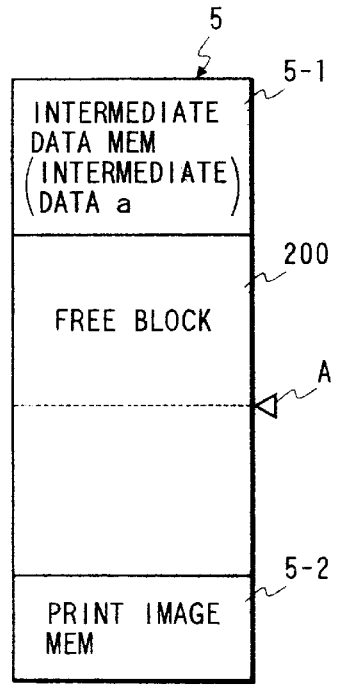
FIGS. 16A to 16E are transition diagrams of memory area in the example 3.

FIG. 16A shows the state where the free block of memory device 5 is sufficient, in which normally the intermediate data memory 5-1 and the print image memory 5-2 only exist, and no output print image memory 5-3 exists, as shown in FIG. 16A. And the intermediate data memory 5-1 and the print image memory 5-2 of memory device 5 has a free area 200 where none of the intermediate data and the print image have been stored. In the figure, A is an overlay threshold, indicating that when intermediate data exceeds an overlay threshold A, the memory capacity necessary for the overlay processing is insufficient.

Figure 16B:
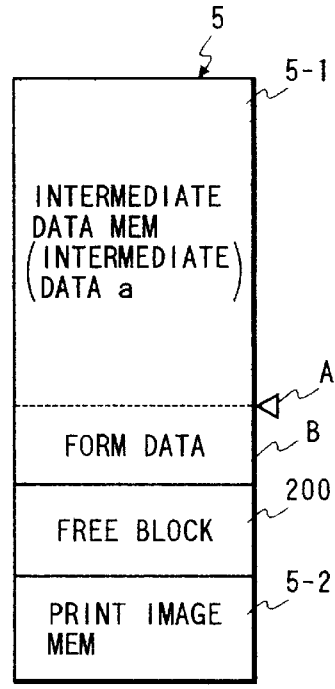

Then, when the intermediate data a stored in the intermediate data memory 5-1 has a large volume and the free block for the intermediate data is less sufficient, the free block which is unused area in the print image memory 5-2 is deleted if possible, extending the free area 200 for storage of intermediate data, but if the intermediate data a exceeds the overlay threshold A, as shown in FIG. 16B, it is apprehended that the memory area for storing data is less sufficient, and so the state of overlay flag 22 is checked. And if the overlay flag 22 is set to "1", an overlay processing request has been received, or the overlay process ing occurs at the previous page, whereby if the overlay processing request has been received, the subsequent generation of intermediate data is interrupted, data memorized in the form data memory 21 is read, and the form data is stored in the intermediate data memory 5-1 (in the figure, the memory area of form data is indicated by B). Because an overlay processing request may be possibly received up to the last page even if no overlay processing request has been issued to the intermediate data generated previously, the overlay flag 22 is set to "1" if the previous page has undergone the overlay processing but even though no overlay processing request has been received.

Figure 16C:
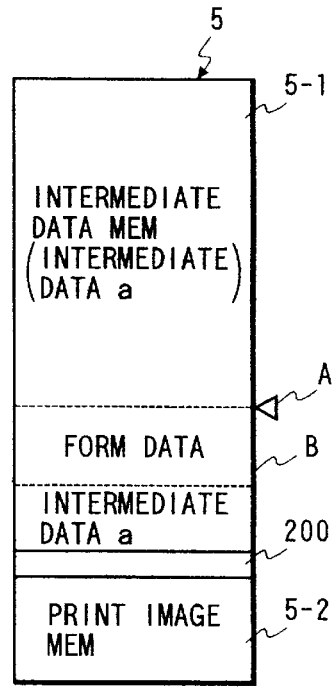
Figure 16D:
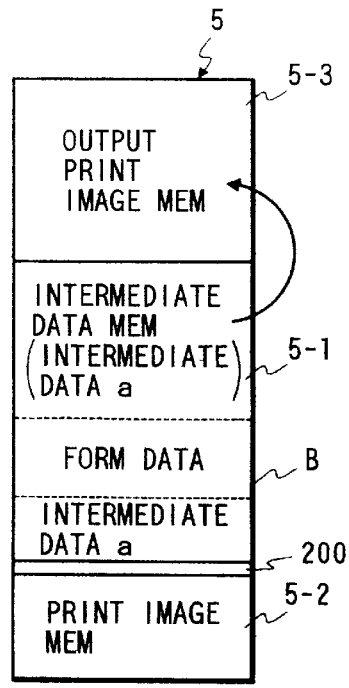

If there is any room in the memory capacity of intermediate data memory 5-1 after the overlay processing, the intermediate data a is generated again and stored, as shown in FIG. 16C.

Also, if the storage capacity of storing the intermediate data is less sufficient, such that the free block 200 necessary can not be reserved even by deleting a part of print image memory 5-2 where the area is unused, the output print image memory 5-3 is created in accordance with the output size, as shown in FIG. 16C, and the image formation (rasterize) which is essentially performed after intermediate data a of one page have been generated is made partially for the intermediate data a, whereby the abnormal termination caused by insufficient memory capacity is avoided. In this case, since the memory capacity of output print image memory 5-3 becomes very large if the image formation is made at an original output resolution (e.g., 600 pdi), the image is formed by lowering the resolution (e.g., from 600 dpi to 300 dpi) so that the memory capacity of output print image memory (full-raster buffer) 5-3 may be made small, compared with the total capacity of memory device 5. That is, the degraded print image is formed.

Figure 16E:
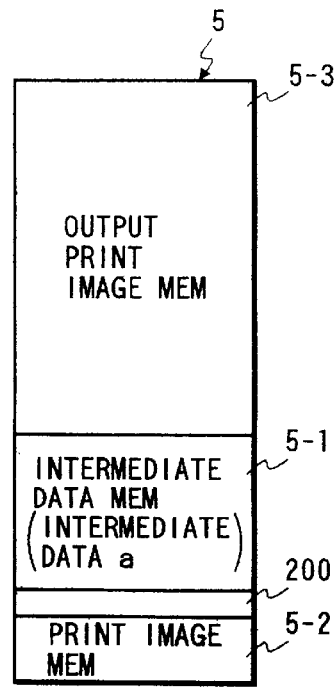

The image formation (rasterize) is performed in order from the intermediate data a formed on the upper side of page, and the output print image memory 5-3 is formed while gradually compressing the intermediate data memory 5-1 downwards, as shown in FIG. 16E. And the image formation (rasterize) for all intermediate data is performed, and expanded into the output print image memory 5-3, so that the intermediate data a is deleted, whereby the intermediate data later generated is memorized in the intermediate data memory 5-1, with a part of the free block 200 as the intermediate data memory 5-1.

And if the processing for one page has been completed, the remaining intermediate data is imagewise formed into the output print image memory 5-3, and output visually onto the recording medium such as a recording sheet by the printer engine 9.

Figure 17:
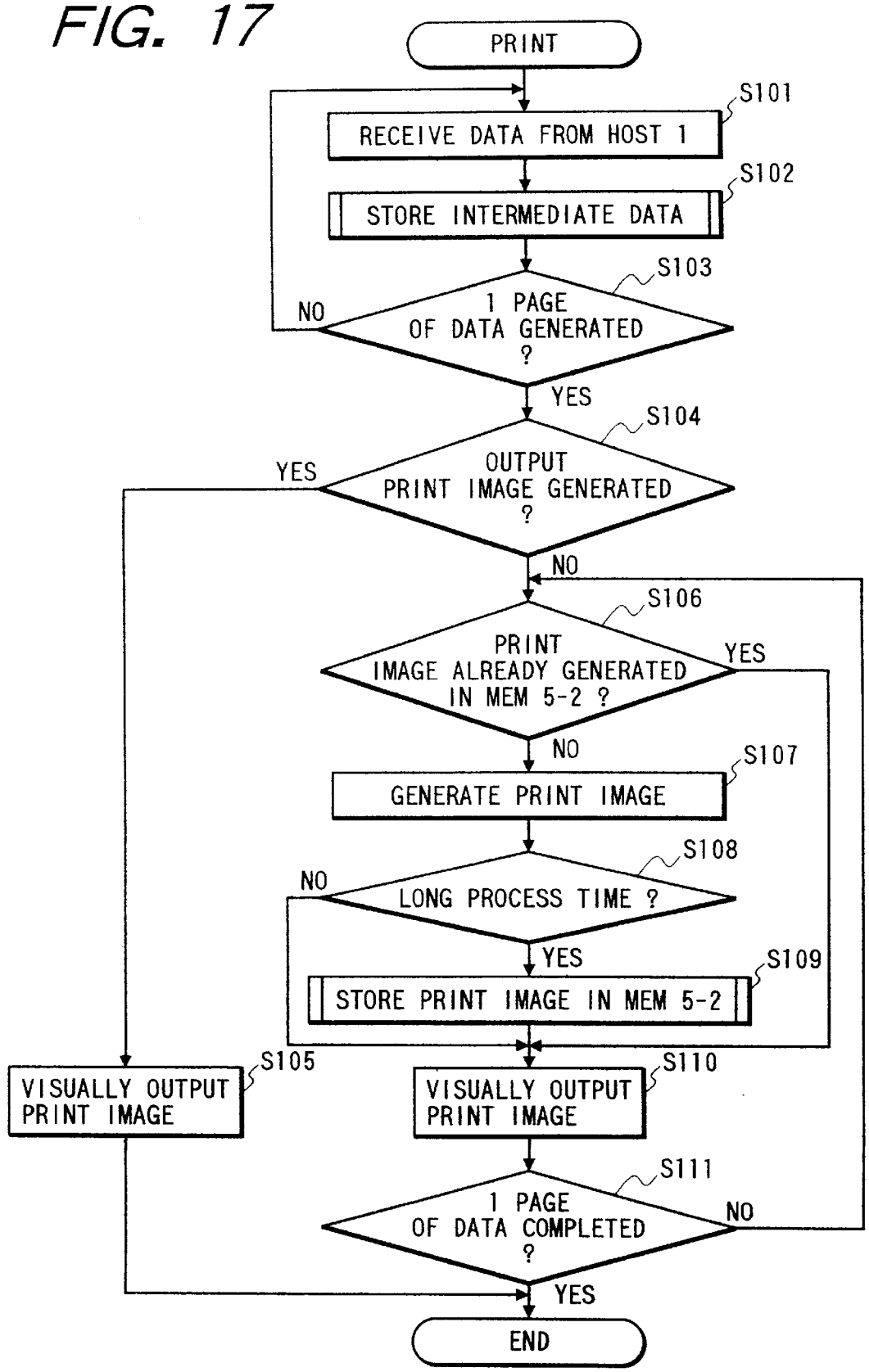
FIG. 17 is a flowchart showing a print control program in the example 3.

FIG. 17 is a flowchart showing a printing procedure from the reception of input data to the output of visual image, this control program being stored in a control program memory 4-2 and executed by the controller 6.

At step S101, the receiver 3 receives input data from the host computer 1 via a predetermined network 2. Then, the CPU 6 transforms the received input data into intermediate data and stores intermediate data in the intermediate data memory 5-1 at step S102. Then, the CPU 6 alters the size of intermediate data memory 5-1, using a program of the memory controller 7, as required, or stores the intermediate data generated in the output print image memory 5-3.

At next step S103, the CPU 6 determines whether or not the intermediate data of one page has been generated, for example, by investigating a paper exhausting instruction. If the intermediate data of one page has not been generated, the procedure returns to step S101 to continue receiving the input data, while if the intermediate data of one page has been generated, the procedure proceeds to step S104, to determine whether or not the print image is generated and stored in the output print image memory 5-3. And if the answer is yes, the procedure proceeds to step S105, judging that due to insufficient capacity of memory device 5, the print image has been created and memorized in the output print image memory (full-raster buffer) 5-3, where the degraded print image is output visually with a specified resolution (e.g., 300 dpi), and the processing is ended.

On the other hand, if the answer of step S104 is no, the steps following step S106 are executed to transform (rasterize) intermediate data into print image in order.

That is, at step S106, the CPU 6 determines whether or not the intermediate data has been already formed as print data, and saved in the print image memory (cache buffer) 5-2. And if the print image has been saved in the print image memory 5-2, the procedure proceeds to step S110, while if the intermediate data has not been yet formed into print image, print image is formed for that intermediate data, using the print image generator 4 (step S107), and the CPU 6 determines whether or not that intermediate data requires a relatively long time in forming the print image (step S108). And if it does not take much time to form the print image, the procedure proceeds to step S110, while if it takes a relatively long time to form the print image, the print image is saved in the print image memory 5-2, and the procedure proceeds to step S110.

Then, at step S110, print image is output to the printer engine 9 to print the visual image. At next step S111, the CPU 6 determines whether or not the print image of one page has been output, and if the print image of one page has not been output, the procedure returns to step S106, to repeat the above steps for the next intermediate data, while if print image of one page has been output, the procedure is ended.

In this way, for the intermediate data requiring a relatively long time to form print image, print image generated is saved in the print image memory (cache buffer) 5-2, and when the intermediate data is processed at the next time, the print image saved in the print image memory 5-2 is reused, thereby omitting the time for print image formation and shortening the time needed for the printing process.

Figure 18:
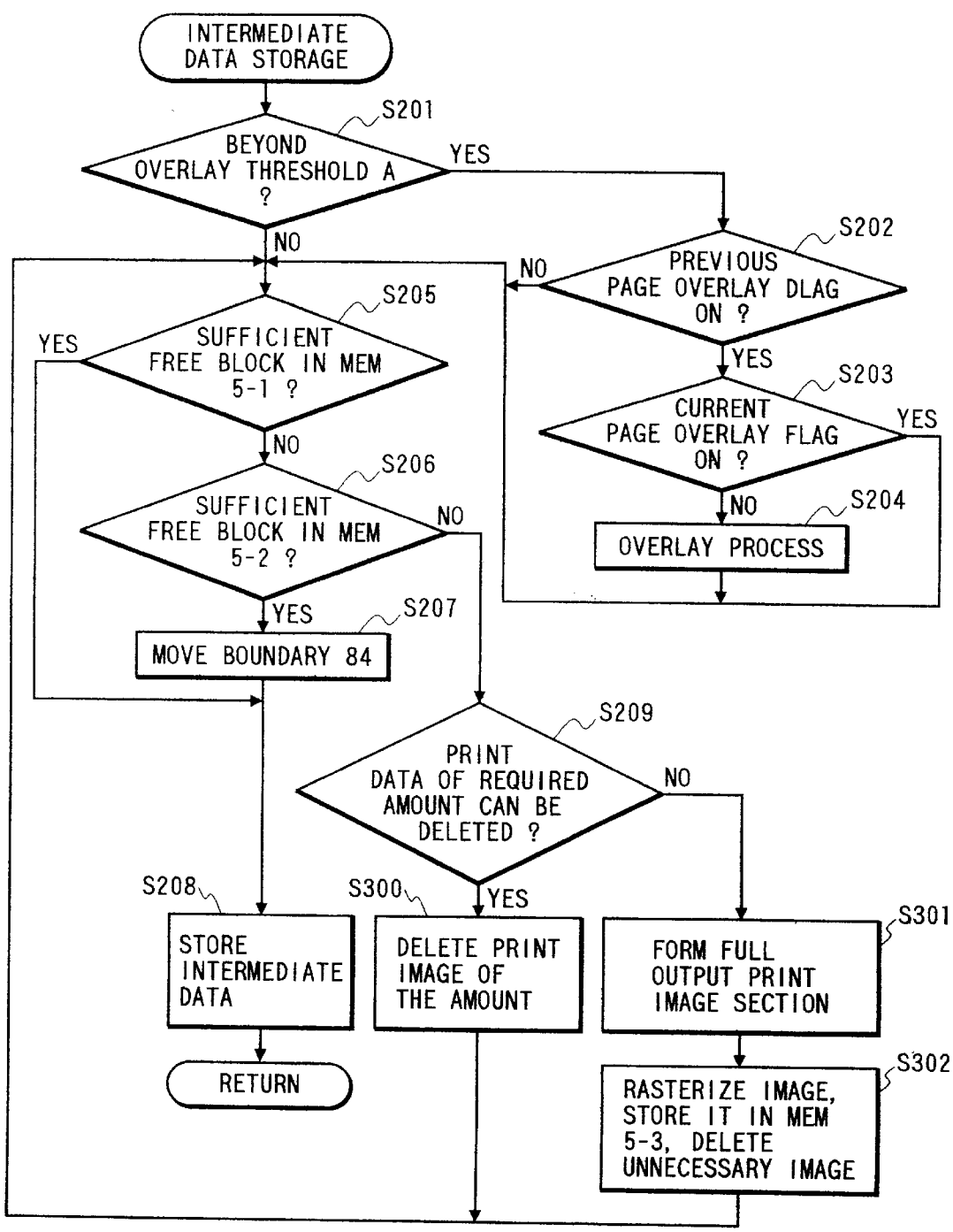
FIG. 18 is a flowchart showing a control program for storage of intermediate data in the example 3.

FIG. 18 is a flowchart showing an intermediate data storage control program which is executed at step S102 as above (FIG. 17). This control program is stored in the control program memory 4-2, and executed by the CPU 6.

At step S201, the CPU 6 determines whether or not the amount of intermediate data saved in the intermediate data memory 5-1 exceeds an overlay threshold A (see FIGS. 16A to 16E). And if not exceeding the overlay threshold A, the procedure proceeds to step S205, while if exceeding the overlay threshold A, the CPU 6 determines whether or not any overlay processing request has been received, or if not received, the previous page has undergone the overlay processing, by referring to the overlay flag 22 (step S202). And if the overlay flag is set to "0", the procedure proceeds to step S205, while if the overlay flag is set to "1", that is, the overlay processing request has been received or the previous page has undergone the overlay processing, the procedure proceeds to step S203, to determine whether or not the overlay processing has been already performed, by referring to the current page overlay flag. And if the current page overlay flag 23 is set to "1", and the overlay processing has been already performed, the procedure proceeds to step S205, because more than one overlay processing is unnecessary, while if the current page overlay flag 23 is set to "0", the overlay processing is performed (step S204). That is, the form data is sent out from the form data memory 21 to the intermediate data memory 5-1, and registered in the intermediate data memory 5-1 (see FIG. 16B). In this way, after the completion of overlay processing, the procedure proceeds to a step S205.

At step S205, the CPU 6 determines whether or not the free block is sufficient to save the intermediate data in the intermediate data memory 5-1. If the free block is sufficient, the procedure proceeds to step S208, to save intermediate data in the intermediate data memory 5-1, and returns to a main routine (FIG. 17). On the other hand, if the free block is less sufficient at step S205, the CPU 6 determines whether or not the free block is sufficient to save the intermediate data within the print image memory 5-2 (step S206). And if the answer is yes, the intermediate data memory 5-1 is extended by moving the boundary 84 of FIG. 15 to the print image memory 5-2 (step S207), print data is saved in the intermediate data memory 5-1 (step S208), and the procedure returns to the main routine (FIG. 17).

On the other hand, if the free block is less sufficient to save the intermediate data in the print image memory 5-2 at step S206, the CPU 6 determines whether or not the memory area of print image memory 5-2 can be deleted by the amount capable of saving the intermediate data (step S209). And if the answer is yes, the print image deletable is deleted to extend the memory area of intermediate data memory 5-1 (step S300), and the procedure returns to step S205 to repeat the above steps.

Also, if the answer at step S209 is no, that is, if the memory area necessary to save the intermediate data can not be obtained even by deleting all the print image deletable, the procedure proceeds to step S301 to create the output print image memory (full-raster buffer) 5-3 from the intermediate buffer already generated. At next step S302, the image formation (rasterize) is performed so that the memory capacity for image after image formation may be smaller by lowering the resolution of output print image (e.g., from 600 dpi to 300 dpi), and the print image is stored in the output print image memory (full-raster buffer) 5-3 reserved, unnecessary intermediate data and print image are deleted, and the procedure returns to step S205. Thereby, unnecessary intermediate data and print data can be deleted in order, so that the free block of memory device 5 can be increased to make it possible to store the intermediate data as desired.

Figure 19:
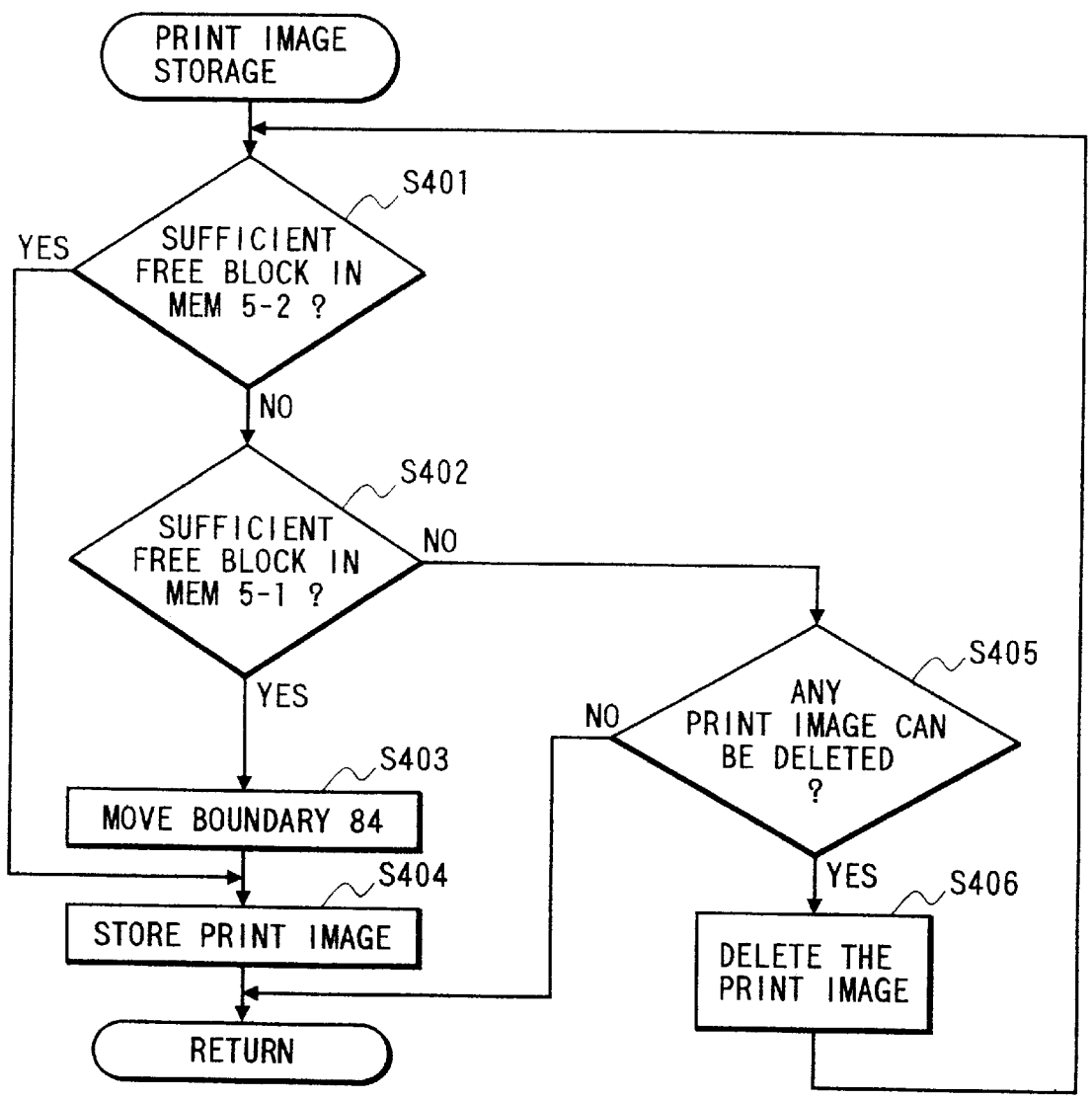
FIG. 19 is a flowchart showing a control program for storage of print image in the example 3.

FIG. 19 is a flowchart showing a print image storing control program which is executed at step S109 (FIG. 17). This control program is stored in the control program memory 4-2 and executed by the CPU 6.

At step S401, the CPU 6 determines whether or not the free block of print image memory 5-2 is sufficient, that is, greater than the memory size of print image to be saved in the print image memory 5-2, if the answer is yes, the procedure proceeds to step S404, to save desired print image converted from the intermediate data, and the procedure returns to the main routine (FIG. 17).

If the answer at step S401 is no, the CPU 6 determines whether or not there is any free block necessary in the intermediate data memory. And if the answer is yes, the memory capacity of print image memory 5-2 is increased by moving the boundary 84 toward the intermediate data memory 5-1, and the print image is saved in the print image memory 5-2 increased (step S404), and the procedure returns to the main routine (FIG. 17).

Also, if there is less free area in the intermediate data memory 5-1, the CPU 6 determines whether or not the print image memorized in the print image memory 5-2 can be deleted (step S405), and if the answer is yes, the print image deletable is deleted (step S406), and the procedure returns to step S401 to repeat the above steps.

On the other hand, if the answer at step S405 is no, that is, if the capacity for print image to be saved can not be reserved even by deleting all the print image deletable, it is abandoned to save its print image, and the procedure returns to the main routine (FIG. 17).

In this way, with this example 3, by applying the memory and overlay processing for the intermediate data, print image for reuse, and output print image, the time required to form the print image can be shortened by the reuse of print image, and the page comprising a quantity of input data can be printed, with the printing order by the overlay processing retained.

Note that the present invention is not limited to the above example 3. For instance, in the above example 3, the print image is memorized by lowering the resolution to avoid insufficient capacity for print image stored in the output print image memory 5-3, but it should be noted that if the color printing function is provided, the insufficient capacity for print image may be also avoided by lowering the gradation, instead of lowering the resolution.

As above detailed, with the printing apparatus and printing processing method of this example 3, the printing contents can be efficiently processed, the insufficient capacity of memory area to store the print data can be avoided, and the printing time can be shortened. Also, if the amount of printing data received exceeds a predetermined value, the reception of printing data is interrupted to enable the overlay processing to be executed, so that the printing order of overlay can be retained, and a desired visual image can be obtained even if the overlay processing is performed.

Next, the memory medium such as a control program memory 4-2 for storing the control program for use with the print control device of each example as above will be described below, using the memory maps from FIGS. 20 to 22.

Figure 20:
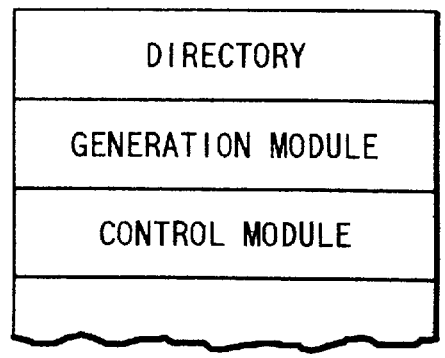
FIG. 20 illustrates a memory map of a memory medium for memorizing the control program in the example 1.

If the capacity of intermediate buffer for memorizing the intermediate data is insufficient, the intermediate buffer for memorizing the intermediate data is reserved by extending the band raster buffer to the full-raster buffer of one page, or deleting the cache buffer, whereby a program code for each of at least a "generation module" and a "control module" as shown in FIG. 20 may be stored in the memory medium for storing the control program to assure the printing process.

Herein, the "generation module" is a program code for generating image data from intermediate data memorized in the intermediate buffer. The "control module" is a program code for reserving the intermediate buffer for memorizing intermediate data by extending the band raster buffer to the full-raster buffer of one page or deleting the cache buffer if the capacity of intermediate buffer is insufficient.

Figure 21:
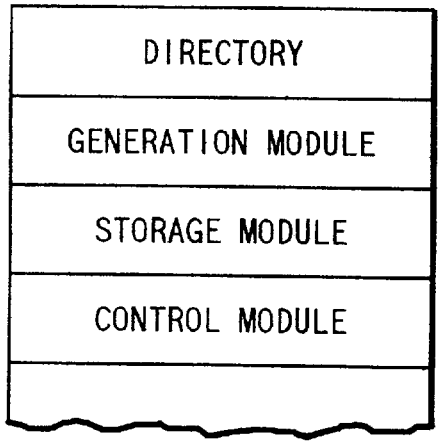
FIG. 21 illustrates a memory map of a memory medium for memorizing the control program in the example 2.

Also, when the capacity of intermediate buffer for memorizing at least one of the intermediate data for front page and the intermediate data for back page is insufficient, the intermediate buffer for memorizing the intermediate data of which the capacity is insufficient is reserved by extending the band raster buffer for memorizing at least one of the image data for front page and the image data for back page to the full-raster buffer of one page, to store a program code for each of at least a "generation module", a "memorizing module" and a "control module", as shown in FIG. 21, in the memory medium for storing the control program to assure the perfect printing.

Herein, the "generation module" is a program code for generating image data for front page and image data for back page from intermediate data for front page and intermediate data for back page memorized in the intermediate buffer. The "memorizing module" is a program code for memorizing image data for front page and image data for back page generated by the generation module in the band raster buffer, respectively. The "control module" is a program code for reserving the intermediate buffer for memorizing intermediate data of which the capacity is insufficient by extending the band raster buffer for memorizing at least one of image data for front page and image data for back page to the full-raster buffer of one page, if the capacity of intermediate buffer for memorizing at least one of intermediate data for front page and intermediate data for back page is insufficient.

Figure 22:
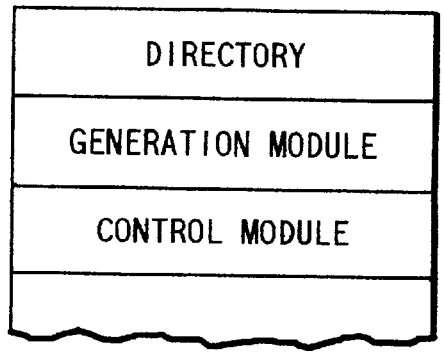
FIG. 22 illustrates a memory map of a memory medium for memorizing the control program in the example 3.

Also, if the capacity of intermediate data memorized in the intermediate buffer exceeds a predetermined amount, the form data memorized in memorizing means is processed, to store a program code for each of at least a "generation module" and a "control module", as shown in FIG. 22, in the memory medium for storing the control program to assure the form overlay printing process.

Herein, the "generation module" is a program code for generating image data from intermediate data memorized in the intermediate buffer. The "control module" is a program code for processing the form data memorized in memory means if the capacity of intermediate buffer memorized in the intermediate buffer exceeds a predetermined amount.

Note that the memory medium may include, in addition to the control program memory 4-2 (ROM) of the example, a floppy disk detachably mounted on the print control device, an optical disk, an erasable magneto-optical disk, a CD-ROM, a CD-R, a magnetic tape, and a non-volatile memory card.

Further, when various kinds of control programs are downloaded from the host computer 1 into a registration area of the memory device 5 within the print control device, the present invention is also applicable.

Also, when the various control programs are downloaded from the host computer via the network into the registration area of the memory device 5 within the print control device, the present invention is also applicable.

What is claimed is:

1. A print control device which allows a printing unit to perform the perfect printing by generating image data from intermediate data, comprising:

generating means for generating image data for front page and image data for back page from intermediate data for front page and intermediate data for back page which are memorized in an intermediate buffer, respectively;

a band raster buffer for memorizing image data for front page and image data for back page which are generated by said generating means, respectively; and control means for reserving said intermediate buffer for memorizing intermediate data for which the memory capacity is insufficient, by extending said band raster buffer for memorizing at least one of said image data for front page and said image data for back page to a full-raster buffer of one page, when the capacity of said intermediate buffer for memorizing at least one of said intermediate data for front page and said intermediate data for back page is insufficient.

2. A print control device according to claim 1, wherein said intermediate data is processed data of input data received from a host computer so that said image data may be generated more easily.

3. A print control device according to claim 1, wherein said image data memorized in said band raster buffer or said full-raster buffer is printed by a printer engine.

4. A print control device according to claim 1, wherein said control means extends said band raster buffer for memorizing at least one of said image data for front page and said image data for back page to the full-raster buffer of one page, when the capacity of said intermediate buffer for memorizing intermediate data for at least one of said intermediate data for front page and said intermediate data for back page is insufficient, and said generating means generates degraded image data from intermediate data memorized in said intermediate buffer of which the memory capacity is insufficient, which degraded image data is stored in said full-raster buffer.

5. A print control device according to claim 4, wherein said degraded image data is image data with the resolution reduced.

6. A print control device according to claim 4, wherein said degraded image data is image data with the gradation reduced.

7. A memory control method In a print control device having an intermediate buffer for memorizing intermediate data and a band raster buffer for memorizing image data which is generated from said intermediate data, comprising:

a generation process of generating image data for front page and image data for back page from intermediate data for front page and intermediate data for back page which are memorized in said intermediate buffer, respectively;

a memorizing process of memorizing said image data for front page and said image data for back page which are generated in said generation process into said band raster buffer; and a control process for reserving said intermediate buffer for memorizing intermediate data for which the memory capacity is insufficient, by extending said band raster buffer for memorizing at least one of said image data for front page and said image data for back page to a full-raster buffer of one page, when the capacity of intermediate buffer for memorizing at least one of said intermediate data for front page and said intermediate data for back page is insufficient.

8. A memory control method according to claim 7, wherein said intermediate data is processed data of input data received from a host computer so that said image data may be generated more easily.

9. A memory control method according to claim 7, wherein said image data memorized in said band raster buffer or said full-raster buffer is printed by a printer engine.

10. A memory control method according to claim 7, wherein said control process comprises extending said band raster buffer for memorizing at least one of said image data for front page and said image data for back page to the full-raster buffer of one page, when the capacity of said intermediate buffer for memorizing at least one of said intermediate data for front page and said intermediate data for back page is insufficient, and said generation process comprises generating degraded image data from intermediate data memorized in said intermediate buffer of which the capacity is insufficient, which degraded image data is stored in said full-raster buffer.

11. A memory control method according to claim 10, wherein said degraded image data is image data with the resolution reduced.

12. A memory control method according to claim 10, wherein said degraded image data is image data with the gradation reduced.

13. A memory medium for storing a control program for use in a print control device having an intermediate buffer for memorizing intermediate data and a band raster buffer for memorizing image data generated from said intermediate data, comprising:

a generation module for use in a generation process of generating image data for front page and image data for back page from intermediate data for front page and intermediate data for back page which are memorized in said intermediate buffer, respectively;

a memorizing module for use in a memorizing process of memorizing said image data for front page and said image data for back page which are generated by said generation module into said band raster buffer; and a control module for use in control process for reserving said intermediate buffer for memorizing intermediate data for which the memory capacity is insufficient, by extending said band raster buffer for memorizing at least one of said image data for front page and said image data for back page to a full-raster buffer of one page, when the capacity of said intermediate buffer for memorizing at least one of said intermediate data for front page and said intermediate data for back page is insufficient.

\* \* \* \* \*

UNITED STATES PATENT AND TRADEMARK OFFICE
CERTIFICATE OF CORRECTION

PATENT NO.    : 6,014,224
DATED         : January 11, 2000
INVENTOR(S)   : KEISUKE MITANI Page 1 of 3

It is certified that error appears in the above-identified patent and that said Letters Patent is hereby corrected as shown below:

<u>ON THE COVER PAGE</u>

[63] In Related U.S. Application Data:
"Continuation" should read --Divisional--.

<u>COLUMN 1</u>

Line 4, "Continuation" should read --Divisional--; and
Line 17, "can not" should read --cannot--.

<u>COLUMN 5</u>

Line 34, "another" should read --other--; and
Line 36, "another" should read --other--.

<u>COLUMN 8</u>

Line 8, "can not" should read --cannot--; and
Line 11, "can not" should read --cannot--.

<u>COLUMN 12</u>

Line 19, "can not" should read --cannot--.

<u>COLUMN 13</u>

Line 64, "can" should read --cannot--; and
Line 65, "not" should be deleted.

UNITED STATES PATENT AND TRADEMARK OFFICE
CERTIFICATE OF CORRECTION

PATENT NO.   : 6,014,224
DATED        : January 11, 2000
INVENTOR(S)  : KEISUKE MITANI It is certified that error appears in the above-identified patent and that said Letters Patent is hereby corrected as shown below:

COLUMN 15

Line 7, "can" should read --cannot--; and
    Line 8, "not" should be deleted.

COLUMN 16

Line 42, "reaterized" should read --rasterized--.

COLUMN 18

Line 35, "can not" should read --cannot--.

COLUMN 19

Line 5, "process ing" should read --processing--;
    Line 23, "can not" should read --cannot--; and
    Line 33, "(e.g., 600 pdi)," should read
--(e.g., 600 dpi),--.

COLUMN 21

Line 36, "can not" should read --cannot--.

COLUMN 22

Line 11, "can not" should read --cannot--.

UNITED STATES PATENT AND TRADEMARK OFFICE
CERTIFICATE OF CORRECTION

PATENT NO.    : 6,014,224
DATED         : January 11, 2000
INVENTOR(S)   : KEISUKE MITANI It is certified that error appears in the above-identified patent and that said Letters Patent is hereby corrected as shown below:

COLUMN 23

Line 52, "the" should be deleted.

COLUMN 24

Line 28, "In" should read --in--.

Signed and Sealed this

Twenty-seventh Day of March, 2001

Attest:

NICHOLAS P. GODICI

Attesting Officer

Acting Director of the United States Patent and Trademark Office